US011853805B2

(12) United States Patent
Barczyk et al.

(10) Patent No.: US 11,853,805 B2
(45) Date of Patent: Dec. 26, 2023

(54) DEVICE AND METHOD OF ASSIGNING A DIGITAL-ASSISTANT TASK TO A MOBILE COMPUTING DEVICE IN RESPONSE TO AN INCIDENT

(71) Applicant: MOTOROLA SOLUTIONS, INC., Chicago, IL (US)

(72) Inventors: Tomasz Barczyk, Cracow (PL); Maciej Urbanek, Cracow (PL); Mateusz Gazdziak, Borowa (PL); Wojceich Kaminski, Cracow (PL)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 240 days.

(21) Appl. No.: 17/056,836

(22) PCT Filed: Jul. 5, 2018

(86) PCT No.: PCT/PL2018/050033
§ 371 (c)(1),
(2) Date: Nov. 19, 2020

(87) PCT Pub. No.: WO2020/009591
PCT Pub. Date: Sep. 1, 2020

(65) Prior Publication Data
US 2021/0200598 A1   Jul. 1, 2021

(51) Int. Cl.
*G06F 9/46* (2006.01)
*G06F 9/50* (2006.01)
(52) U.S. Cl.
CPC ............ *G06F 9/5055* (2013.01); *G06F 9/505* (2013.01); *G06F 9/5038* (2013.01); *G06F 2209/5021* (2013.01)
(58) Field of Classification Search
CPC ...... G06F 9/5055; G06F 9/5038; G06F 9/505; G06F 2209/5021
(Continued)

(56) References Cited

U.S. PATENT DOCUMENTS 6,336,139 B1 * 1/2002 Feridun ............... G06F 11/3664
709/224
8,213,518 B1 * 7/2012 Wang ................... H04N 19/436
348/721

(Continued)

FOREIGN PATENT DOCUMENTS

CN       103299327 A  *  9/2013  ............. G06Q 20/20
WO    2018021922 A1     2/2018

OTHER PUBLICATIONS

English Translation of CN-103299327-A (Year: 2013).*

(Continued)

*Primary Examiner* — Bradley A Teets
(74) *Attorney, Agent, or Firm* — Raguraman Kaumaresan

(57) ABSTRACT

A process and device for assigning a digital-assistant task to a mobile computing device in response to an incident. A mobile computing device determines digital-assistant tasks to be executed in response to the incident. Further the mobile computing device transmits a request for digital-assistant capability information to other mobile computing devices implementing respective digital assistants. Based on the digital-assistant capability received from one or more of the other mobile computing devices, the mobile computing device maps at least one of the digital-assistant tasks to the one or more of the other mobile computing devices. The mobile computing device assigns the at least one of the digital-assistant tasks to the mapped one or more of the other mobile computing devices and further transmits an instruction to execute the assigned digital-assistant tasks to the mapped one or more of the other mobile computing devices.

14 Claims, 9 Drawing Sheets

(58) Field of Classification Search
USPC .......................................................... 718/104
See application file for complete search history.

(56) References Cited

U.S. PATENT DOCUMENTS

| | | | |
|---|---|---|---|
| 8,805,431 | B2 | 8/2014 | Vasavada et al. |
| 9,172,747 | B2 | 10/2015 | Walters et al. |
| 9,554,239 | B2 | 1/2017 | Swaminathan et al. |
| 9,661,040 | B2 | 5/2017 | Kobayashi |
| 10,027,801 | B1 | 7/2018 | Subramanyam et al. |
| 10,616,343 | B1 * | 4/2020 | Alameh .................. H04L 67/12 |
| 2009/0284348 | A1 | 11/2009 | Pfeffer |
| 2015/0256993 | A1 * | 9/2015 | Bellamkonda .......... H04W 8/12 |
| | | | 455/433 |
| 2015/0278732 | A1 | 10/2015 | Fiedler et al. |
| 2016/0134929 | A1 * | 5/2016 | Robii ................. H04N 21/4508 |
| | | | 725/81 |
| 2016/0203123 | A1 | 7/2016 | Kozloski et al. |
| 2017/0289350 | A1 | 10/2017 | Philbin |
| 2017/0359712 | A1 | 12/2017 | Meredith et al. |
| 2018/0115468 | A1 * | 4/2018 | Bildhauer ............. G06F 9/5055 |
| 2018/0268867 | A1 * | 9/2018 | Matsumoto ............ G11B 27/28 |

OTHER PUBLICATIONS

Yu, Shijun & Spaccapietra, Stefano & Cullot, Nadine & Aufaure, Marie-Aude. (2004). User Profiles in Location-based Services: Make Humans More Nomadic and Personalized, https://infoscience.epfl.ch/record/99142/files/NG2103.pdf, all pages.

S. Bende and R. Shedge, "Context based genuine content recommendation system using Hadoop," 2016 IEEE International Conference on Computational Intelligence and Computing Research (ICCIC), Chennai, 2016, pp. 1-8, doi: 10.1109/ICCIC.2016.7919562.

The International Search Report and the Written Opinion corresponding patent application No. PCT/PL2018/050033, filed: Jul. 5, 2018, all pages.

* cited by examiner

DEVICE AND METHOD OF ASSIGNING A DIGITAL-ASSISTANT TASK TO A MOBILE COMPUTING DEVICE IN RESPONSE TO AN INCIDENT

BACKGROUND OF THE INVENTION

Tablets, laptops, phones, and mobile or portable radios are now in common use by users, such as first responders and civilians, and provide such users with instant access to increasingly valuable additional information such as vehicle histories, arrest records or outstanding warrants, health information, and other information that may aid the user in responding to an incident. An incident demands a variety of tasks to be performed to better provide aid at the incident. However, when the incident happens in an area which has poor network coverage, it makes it difficult for first responders and/or civilians to communicate information related to the incident and/or request for resources for responding to the incident.

BRIEF DESCRIPTION OF THE SEVERAL VIEWS OF THE DRAWINGS

The accompanying figures, where like reference numerals refer to identical or functionally similar elements throughout the separate views, which together with the detailed description below are incorporated in and form part of the specification and serve to further illustrate various embodiments of concepts that include the claimed invention, and to explain various principles and advantages of those embodiments.

Figure 1:
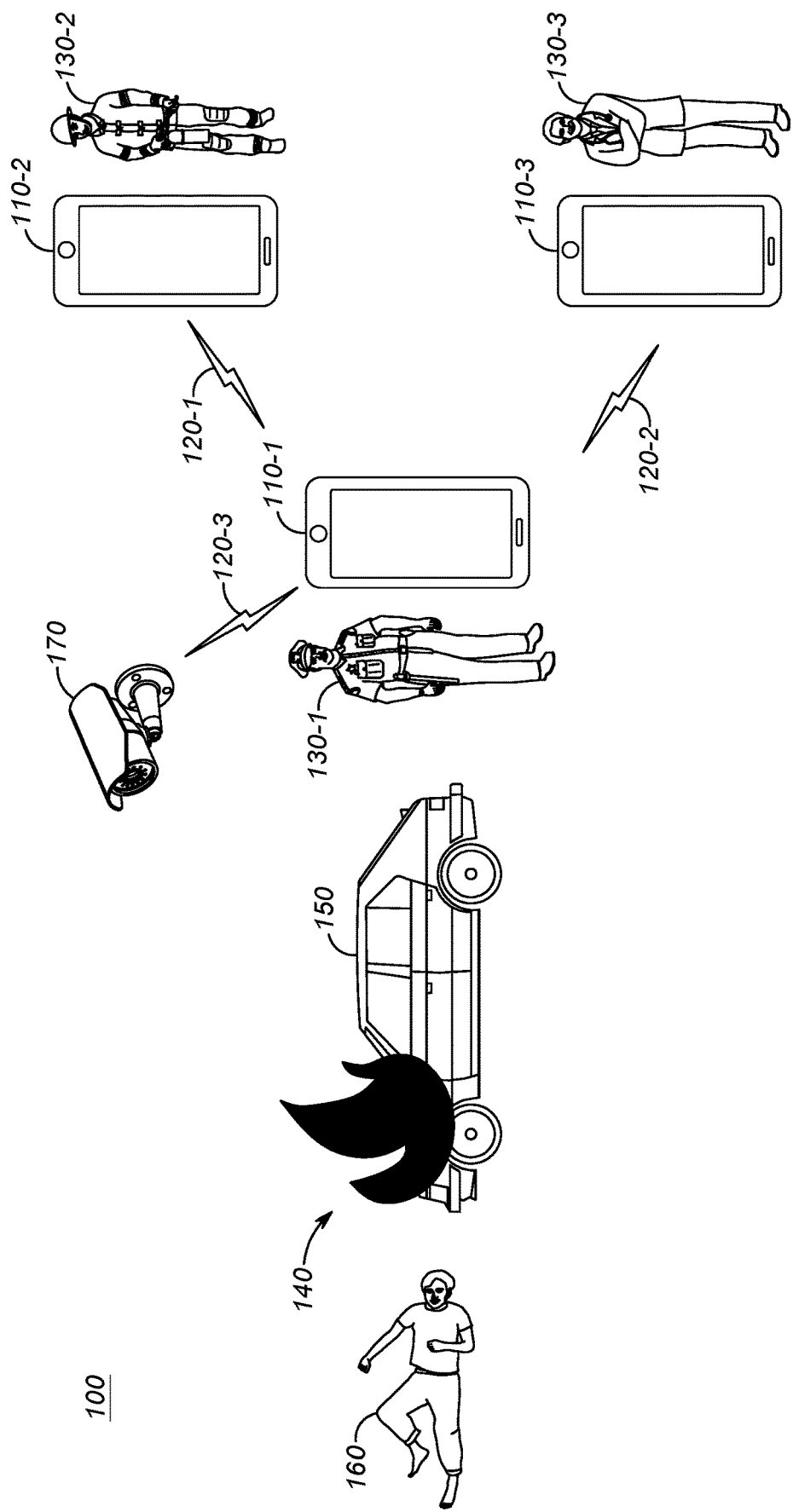
FIG. 1 is a system diagram illustrating a system in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

Public safety officers responding to an incident often report firsthand information about the incident to a dispatcher in order to request for resources for providing better aid at the incident. However, when an incident happens in an area where public safety officers do not have access to a reliable network, public safety officers may not be able to share data captured at the incident location to the dispatcher's communication system. Also, sometimes even if public safety officers are able to request for resources from other officers/civilians who are located nearby, officers may not be able to readily identify the resources that are required for responding to the incident, and therefore may require the support of computing resources (referred to as digital assistants) that are able to automatically process the captured information and identify required resources. For example, processing data such as video data captured at the incident is important to identify a condition of an injured person, and further request for a resource (e.g., first responder of a particular type such as a medic or a special equipment needed to treat the injured person or unlock a vehicle door) for providing better aid to the injured person. However, not all computing devices/applications may have capability and/or resources to process the captured data, for example, due to limited charge level in the battery, unavailability of software applications and/or hardware components to perform the processing, low processor speed etc.

In order to address the above concerns, disclosed is an improved process of requesting resources by assigning digital-assistant tasks in response to an incident. The disclosed process automatically determines, via a mobile computing device, digital-assistant tasks that are to executed in response to an incident and further assigns a digital-assistant task (e.g., to process captured incident data and/or dispatch resources based on processing) to one or more other mobile computing devices based on digital-assistant capability information provided by the one or more other mobile computing devices. The disclosed process allows mobile computing devices that are within a direct transmission range of each other to assign digital-assistant tasks to each other and further request/receive resources from each other without the assistant of a dispatcher i.e., even while the mobile computing devices are disconnected from a communication system for contacting a dispatcher or a central entity that is otherwise responsible for coordinating incident response that includes identifying and assigning further resources needed to respond to the incident.

One embodiment provides a mobile computing device that includes a wireless transceiver and an electronic processor communicatively coupled to the wireless transceiver. The electronic processor is configured to obtain incident data associated with an incident; determine, based on the obtained incident data, a plurality of digital-assistant tasks to be executed in response to the incident; transmit, via the wireless transceiver, a request for digital-assistant capability information to a plurality of other mobile computing devices implementing respective digital assistants; receive, via the wireless transceiver, digital-assistant capability information from one or more of the plurality of other mobile computing devices; map at least one of the plurality of digital-assistant tasks to the one or more of the plurality of other mobile computing devices based on the received digital-assistant capability information; assign the at least one of the plurality of digital-assistant tasks to the mapped one or more of the plurality of other mobile computing devices; and transmit, via the wireless transceiver, an instruction to execute the assigned at least one of the plurality of digital-assistant tasks to the mapped one or more of the plurality of other mobile computing devices.

Another embodiment provides a method of assigning a digital-assistant task in response to an incident. The method includes obtaining, at a mobile computing device, an incident data associated with an incident; determining, at the mobile computing device, a plurality of digital-assistant tasks to be executed in response to the incident based on the obtained incident data; wirelessly transmitting a request for digital-assistant capability information from the mobile computing device to a plurality of other mobile computing devices implementing respective digital assistants; wirelessly receiving, at the mobile computing device, digital-assistant capability information from one or more of the plurality of other mobile computing devices; mapping, at the mobile computing device, at least one of the plurality of digital-assistant tasks to the one or more of the plurality of other mobile computing devices based on the received digital-assistant capability information; assigning, at the mobile computing device, the at least one of the plurality of digital-assistant tasks to the mapped one or more of the plurality of other mobile computing devices; and wirelessly transmitting an instruction to execute the assigned at least one of the plurality of digital-assistant tasks from the mobile computing device to the mapped one or more of the plurality of other mobile computing devices.

A further embodiment provides a method that includes: wirelessly receiving, at a second mobile computing device, a request for digital-assistant capability information from a first mobile computing device; wirelessly transmitting, at the second mobile computing device, digital-assistant capability information to the first mobile computing device, the digital-assistant capability information identifying one or more capabilities of a digital assistant implemented by the second mobile computing device; wirelessly receiving, at the second mobile computing device, an instruction to execute an assigned digital-assistant task from the first mobile computing device, the instruction further including at least one portion of an incident data associated with an incident for which the assigned digital-assistant task is to be executed; executing, at the second mobile computing device, the assigned digital-assistant task by processing the at least one portion of the incident data; generating, at the second mobile computing device, an electronic task report identifying one or more of status of execution of the task, information related to one or more entities to be dispatched to a location of the incident, established time of arrival of the one or more entities, and a condition or status of a person, object, or entity (POE) that is identified from the at least one portion of the incident data; and wirelessly transmitting, at the second mobile computing device, the electronic task report to the first mobile computing device.

Each of the above-mentioned embodiments will be discussed in more detail below, starting with example communication system and device architectures of the system in which the embodiments may be practiced, followed by an illustration of processing steps for achieving the method, device, and system described herein. Further advantages and features consistent with this disclosure will be set forth in the following detailed description, with reference to the figures.

Referring now to the drawings, and in particular FIG. 1, a communication system diagram illustrates a system 100 including a plurality of mobile computing devices 110-1, 110-2, and 110-3. The plurality of mobile computing devices 110-1, 110-2, and 110-3 can be interchangeably referred to, collectively, as mobile computing devices 110, and generically as a mobile computing device 110. Although, only three mobile computing devices 110 are shown in FIG. 1 for illustrative purposes, any number of mobile computing devices 110 may be deployed in the system 100. Each mobile computing device 110 includes one or more wireless communication interfaces for communicating directly with other mobile computing devices 110. Direct-mode wireless air-interface links 120-1 and 120-2 communicatively couple the mobile computing device 110-1 with mobile computing devices 110-2 and 110-3, respectively. Similar direct-mode wireless air-interface link (not shown) may communicatively couple the mobile computing devices 110-2 and 110-3.

In accordance with some embodiments, each mobile computing device 110 communicates with one or more other mobile computing devices 110 on a common operating channel using a direct mode of operation (DMO). As used herein, the term "direct mode of operation" refers to a mode of operation where mobile computing devices 110 communicate directly with one another using a direct-mode wireless connection which is independent of larger communication network and further without sending communications through a gateway or via a dispatch server. In accordance with some embodiments, the mobile computing devices 110 use direct mode of operation to communicate with one or more other mobile computing devices 110. For example, the mobile computing device 110-1 is wirelessly coupled to mobile computing devices 110-2 and 110-3 via direct-mode wireless air-interface link 120-1, 120-2, respectively in accordance with one or more direct-mode wireless air-interface protocols, such as Bluetooth, near field communication (NFC), Infrared Data Association (IrDA), ZigBee, direct-mode land-mobile-radio (LMR), and/or Wi-Fi, as long as the devices are within mutual transmission range of one another.

The mobile computing devices 110-1, 110-2, and 110-3 may be operated by users 130-1, 130-2, and 130-3 (for example, a public safety personnel), respectively, who may carry or wear the mobile computing device 110. The plurality of users 130-1, 130-2, and 130-3 can be interchangeably referred to, collectively, as users 130, and generically as a user 130. In FIG. 1, each user 130 is shown as being associated with a single mobile computing device 110, however each user 130 can have any number of mobile computing devices 110 as shown in FIG. 2.

Figure 2:
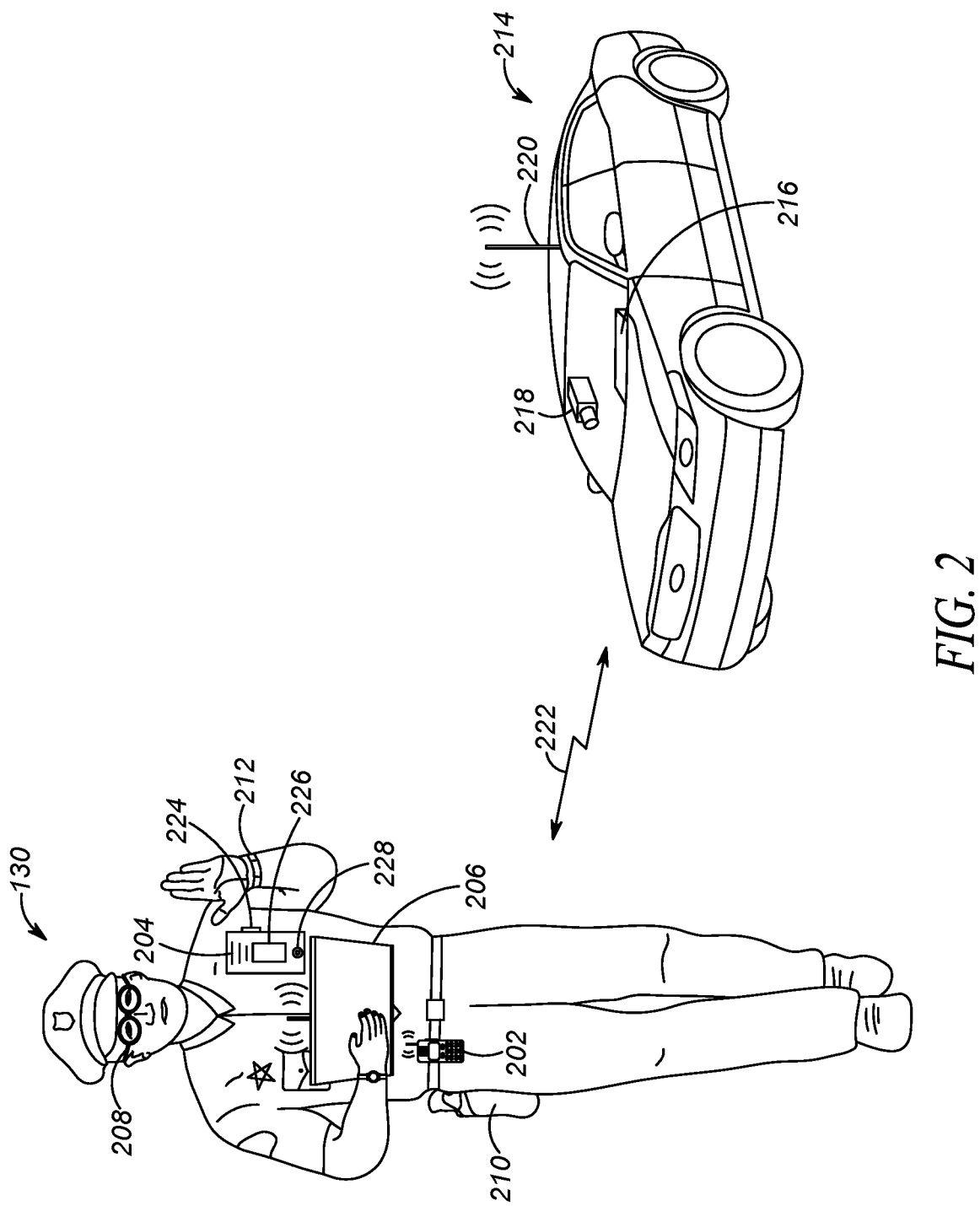
FIG. 2 is a diagram illustrating a set of mobile computing devices that may be associated with a single user.

Referring to FIG. 2, a set of mobile computing devices 110 that a single user 130 (illustrated in FIG. 2 as a first responder police officer) may wear, such as a primary battery-powered portable radio 202 used for narrowband and/or broadband direct-mode or infrastructure communications, a battery-powered radio speaker microphone (RSM) video capture device 204, a laptop 206 having an integrated video camera and used for data applications such as incident support applications, smart glasses 208 (for example, which may be virtual reality, augmented reality, or mixed reality glasses), sensor-enabled holster 210, and/or biometric sensor wristband 212. In some embodiments, the user 130 may be associated with a vehicle 214 having one or more integrated mobile computing devices including a mobile communication device 216, an associated vehicular video camera 218, and a coupled vehicular transceiver 220. Each of the portable radio 202, RSM video capture device 204, laptop 206, and vehicular mobile communication device 216 may be capable of directly wirelessly communicating via direct-mode wireless air-interface link 222.

The portable radio 202, in particular, may be any communication device used for infrastructure radio access network (RAN) (not shown) or direct-mode media (for example, voice, audio, video, etc.) communication via a long-range wireless transmitter and/or transceiver that has a transmitter transmit range on the order of miles, for example, 0.5-50 miles, or 3-20 miles (for example, in comparison to a short-range transmitter such as a Bluetooth, Zigbee, or NFC transmitter) with other communication devices and/or the infrastructure RAN. The long-range transmitter may implement a direct-mode, conventional, or trunked land mobile radio (LMR) standard or protocol such as European Telecommunications Standards Institute (ETSI) Digital Mobile Radio (DMR), a Project 25 (P25) standard defined by the Association of Public Safety Communications Officials International (APCO), Terrestrial Trunked Radio (TETRA), or other LMR radio protocols or standards. In other embodiments, the long range transmitter may implement a Long Term Evolution (LTE), LTE-Advance, or 5G protocol including multimedia broadcast multicast services (MBMS) or single site point-to-multipoint (SC-PTM) over which an open mobile alliance (OMA) push to talk (PTT) over cellular (OMA-PoC), a voice over IP (VoIP), an LTE Direct or LTE Device to Device, or a PTT over IP (PoW) application may be implemented. In still further embodiments, the long range transmitter may implement a Wi-Fi protocol perhaps in accordance with an IEEE 802.11 standard (for example, 802.11a, 802.11b, 802.11g) or a WiMAX protocol perhaps operating in accordance with an IEEE 802.16 standard.

In the example of FIG. 2, the portable radio 202 may form the hub of communication connectivity for the user 130, through which other accessory devices, such as a biometric sensor (for example, the biometric sensor wristband 212), an activity tracker, a weapon status sensor (for example, the sensor-enabled holster 210), a heads-up-display (for example, the smart glasses 208), the RSM video capture device 204, and/or the laptop 206 may communicatively couple.

In order to communicate with and exchange video, audio, and other media and communications with the RSM video capture device 204, laptop 206, and/or smart glasses 208, the portable radio 202 may contain one or more physical electronic ports (such as a universal serial bus (USB) port, an Ethernet port, an audio jack, etc.) for direct electronic coupling with the RSM video capture device 204, laptop 206, and/or smart glasses 208. In some embodiments, the portable radio 202 may contain a short-range transmitter (for example, in comparison to the long-range transmitter such as a LMR or Broadband transmitter) and/or transceiver for wirelessly coupling with the RSM video capture device 204, laptop 206, and/or smart glasses 208. The short-range transmitter may be a Bluetooth, Zigbee, or near field communication (NFC) transmitter having a transmit range on the order of 0.01-100 meters, or 0.1-10 meters. In other embodiments, the RSM video capture device 204, the laptop 206, and/or the smart glasses 208 may contain their own long-range transceivers and may communicate with one another and/or with the infrastructure RAN or vehicular transceiver 220 directly without passing through portable radio 202.

The RSM video capture device 204 provides voice functionality features similar to a traditional RSM, including one or more of acting as a remote microphone that is closer to the user's 130 mouth, providing a remote speaker allowing playback of audio closer to the user's 130 ear, and including a PTT switch/interface or other type of PTT input. The voice and/or audio recorded at the remote microphone may be provided to the portable radio 202 for storage and/or analysis or for further transmission to other mobile communication devices or the infrastructure RAN, or may be directly transmitted by the RSM video capture device 204 to other computing devices or to the infrastructure RAN. The voice and/or audio played back at the remote speaker may be received from the portable radio 202 or received directly from one or more other communication devices or the infrastructure RAN. The RSM video capture device 204 may include a separate physical PTT switch 224 that functions, in cooperation with the portable radio 202 or on its own, to maintain the portable radio 202 and/or RSM video capture device 204 in a monitor only mode, and which switches the device(s) to a transmit-only mode (for half-duplex devices) or transmit and receive mode (for full-duplex devices) upon depression or activation of the PTT switch 224. The portable radio 202 and/or RSM video capture device 204 may form part of a group communications architecture that allows a single mobile computing device to communicate with one or more group members (not shown) associated with a particular group of devices at a same time.

Additional features may be provided at the RSM video capture device 204 as well. For example, a display screen 226 may be provided for displaying images, video, and/or text to the user 130 or to someone else. The display screen 226 may be, for example, a liquid crystal display (LCD) screen or an organic light emitting display (OLED) display screen. In some embodiments, a touch sensitive input interface may be incorporated into the display screen 226 as well, allowing the user 130 to interact with content provided on the display screen 226. A soft PTT input may also be provided, for example, via such a touch interface.

A video camera 228 may also be provided at the RSM video capture device 204, integrating an ability to capture images and/or video and store the captured image data (for further analysis) or transmit the captured image data as an image or video stream to the portable radio 202 and/or to other mobile computing devices directly. The video camera 228 and RSM remote microphone may be used, for example, for capturing audio and/or video of a field-of-view associated with the user 130, perhaps including a suspect and the suspect's surroundings, storing the captured image and/or audio data for further analysis or transmitting the captured audio and/or video data as an audio and/or video stream to the portable radio 202 and/or to other mobile computing devices 110 for further analysis. An RSM remote microphone of the RSM video capture device 204 may be an omni-directional or unidirectional microphone or array of omni-directional or unidirectional microphones that may be capable of identifying a direction from which a captured sound emanated.

In some embodiments, the RSM video capture device 204 may be replaced with a more limited body worn camera that may include the video camera 228 and/or microphone noted above for capturing audio and/or video, but may forego one or more of the features noted above that transform the body worn camera into a more full featured RSM, such as the separate physical PTT switch 224 and the display screen 226, and remote microphone functionality for voice communications in cooperation with portable radio 202.

The laptop 206, in particular, may be any wireless communication device used direct-mode media communication via a short-range wireless transmitter with other mobile computing devices 110. The laptop 206 includes a display screen for displaying a user interface to an operating system and one or more applications running on the operating system, such as a broadband PTT communications application, a web browser application, a vehicle history database application, a workflow application, a forms or reporting tool application, an arrest record database application, an outstanding warrant database application, a mapping and/or navigation application, a health information database application, and/or other types of applications that may require user interaction to operate. The display screen may be, for example, an LCD screen or an OLED display screen. In some embodiments, a touch sensitive input interface may be incorporated into the display screen as well, allowing the user 130 to interact with content provided on the display screen. A soft PTT input may also be provided, for example, via such a touch interface.

Front and/or rear-facing video cameras may also be provided at the laptop 206, integrating an ability to capture video and/or audio of the user 130 and the user's 130 surroundings, perhaps including a field-of-view of the user 130 and/or a suspect (or potential suspect) and the suspect's surroundings, and store and/or otherwise process the captured video and/or audio for further analysis or transmit the captured video and/or audio as a video and/or audio stream to the portable radio 202, other mobile computing devices 110.

The smart glasses 208 may include a digital imaging device, an electronic processor, a short-range and/or long-range transceiver device, and/or a projecting device. The smart glasses 208 may maintain a bi-directional connection with the portable radio 202 and provide an always-on or on-demand video feed pointed in a direction of the user's 130 gaze via the digital imaging device, and/or may provide a personal display via the projection device integrated into the smart glasses 208 for displaying information such as text, images, or video received from the portable radio 202 or another mobile computing device 110. In some embodiments, the smart glasses 208 may include its own transceiver and may communicate with other mobile computing devices 110 or vehicular transceiver 220 directly without passing through portable radio 202. In some embodiments, an additional user interface mechanism such as a touch interface or gesture detection mechanism may be provided at the smart glasses 208 that allows the user 130 to interact with the display elements displayed on the smart glasses 208 or projected into the user's 130 eyes, or to modify operation of the digital imaging device. In other embodiments, a display and input interface at the portable radio 202 may be provided for interacting with smart glasses 208 content and modifying operation of the digital imaging device, among other possibilities.

The smart glasses 208 may provide a virtual reality interface in which a computer-simulated reality electronically replicates an environment with which the user 130 may interact. In some embodiments, the smart glasses 208 may provide an augmented reality interface in which a direct or indirect view of real-world environments in which the user is currently disposed are augmented (that is, supplemented, by additional computer-generated sensory input such as sound, video, images, graphics, GPS data, or other information). In still other embodiments, the smart glasses 208 may provide a mixed reality interface in which electronically generated objects are inserted in a direct or indirect view of real-world environments in a manner such that they may co-exist and interact in real time with the real-world environment and real world objects.

The sensor-enabled holster 210 may be an active (powered) or passive (non-powered) sensor that maintains and/or provides state information regarding a weapon or other item normally disposed within the user's 130 sensor-enabled holster 210. The sensor-enabled holster 210 may detect a change in state (presence to absence) and/or an action (removal) relative to the weapon normally disposed within the sensor-enabled holster 210. The detected change in state and/or action may be reported to the portable radio 202 via its short-range transceiver. In some embodiments, the sensor-enabled holster 210 may also detect whether the first responder's hand is resting on the weapon even if it has not yet been removed from the holster and provide such information to portable radio 202. In some embodiments, a weapon of the user 130 may include a sensor that detects when the weapon is discharged. The detected discharge may be reported to the portable radio 202, for example. Other possibilities exist as well.

The biometric sensor wristband 212 may be an electronic device for tracking an activity of the user 130 or a health status of the user 130, and may include one or more movement sensors (such as an accelerometer, magnetometer, and/or gyroscope) that may periodically or intermittently provide to the portable radio 202 indications of orientation, direction, steps, acceleration, and/or speed, and indications of health such as one or more of a captured heart rate, a captured breathing rate, and a captured body temperature of the user 130, perhaps accompanying other information. In some embodiments, the biometric sensor wristband 212 may include its own transceiver and may communicate with other mobile computing devices or vehicular transceiver 220 directly without passing through portable radio 202.

An accelerometer is a device that measures acceleration. Single and multi-axis models are available to detect magnitude and direction of the acceleration as a vector quantity, and may be used to sense orientation, acceleration, vibration shock, and falling. A gyroscope is a device for measuring or maintaining orientation, based on the principles of conservation of angular momentum. One type of gyroscope, a microelectromechanical system (MEMS) based gyroscope, uses lithographically constructed versions of one or more of a tuning fork, a vibrating wheel, or resonant solid to measure orientation. Other types of gyroscopes could be used as well. A magnetometer is a device used to measure the strength and/or direction of the magnetic field in the vicinity of the device, and may be used to determine a direction in which a person or device is facing.

The heart rate sensor may use electrical contacts with the skin to monitor an electrocardiography (EKG) signal of its wearer, or may use infrared light and imaging device to optically detect a pulse rate of its wearer, among other possibilities.

A breathing rate sensor may be integrated within the sensor wristband 212 itself, or disposed separately and communicate with the sensor wristband 212 via a short range wireless or wired connection. The breathing rate sensor may include use of differential capacitive circuits or capacitive transducers to measure chest displacement and thus breathing rates. In other embodiments, a breathing sensor may monitor a periodicity of mouth and/or nose-exhaled air (for example, using a humidity sensor, temperature sensor, capnometer or spirometer) to detect a respiration rate. Other possibilities exist as well.

A body temperature sensor may include an electronic digital or analog sensor that measures a skin temperature using, for example, a negative temperature coefficient (NTC) thermistor or a resistive temperature detector (RTD), may include an infrared thermal scanner module, and/or may include an ingestible temperature sensor that transmits an internally measured body temperature via a short range wireless connection, among other possibilities.

Although the biometric sensor wristband 212 is shown in FIG. 1 as a bracelet worn around the wrist, in other examples, the biometric sensor wristband 212 may additionally and/or alternatively be worn around another part of the body, or may take a different physical form including an earring, a finger ring, a necklace, a glove, a belt, or some other type of wearable, ingestible, or insertable form factor. In some embodiments, the biometric sensor wristband 212 or another device of the user 130 may detect characteristics of the environment of the user 130 (for example, temperature, humidity, air quality, and the like).

The portable radio 202, RSM video capture device 204, laptop 206, smart glasses 208, sensor-enabled holster 210, and/or biometric sensor wristband 212 may form a personal area network (PAN) via corresponding short-range PAN transceivers, which may be based on a Bluetooth, Zigbee, Bluetooth Low Energy, WiFi, Near Field Communication (NFC), Radio Frequency ID (RFID) or other short-range wireless protocol having a transmission range on the order of meters, tens of meters, or hundreds of meters.

The portable radio 202 and/or RSM video capture device 204 (or any other device in FIG. 1, for that matter) may each include a location determination device integrated with or separately disposed in the portable radio 202 and/or RSM 204 and/or in respective receivers, transmitters, or transceivers of the portable radio 202 and RSM 204 for determining a location of the portable radio 202 and RSM 204. The location determination device may be, for example, a global positioning system (GPS) receiver or wireless triangulation logic using a wireless receiver or transceiver and a plurality of wireless signals received at the wireless receiver or transceiver from different locations, among other possibilities. The location determination device may also include an orientation sensor for determining an orientation that the device is facing. Each orientation sensor may include a gyroscope and/or a magnetometer. Other types of orientation sensors could be used as well. The location may then be stored locally or transmitted via the transmitter or transceiver to other mobile computing devices 110.

The vehicle 214 associated with the user 130 may include the mobile communication device 216, the vehicular video camera 218 and/or microphone, and the vehicular transceiver 220, all of which may be coupled to one another via a wired and/or wireless vehicle area network (VAN), perhaps along with other sensors physically or communicatively coupled to the vehicle 214. The vehicular transceiver 220 may include a transceiver for directly wirelessly communicating with other mobile computing devices such as the portable radio 202, the RSM 204, and the laptop 206 via direct-mode wireless air-interface link 222. The vehicular transceiver 220 may further include a short-range wireless transceiver or wired transceiver for communicatively coupling between the mobile communication device 216 and/or the vehicular video camera 218 in the VAN. The mobile communication device 216 may, in some embodiments, include the vehicular transceiver 220 and/or the vehicular video camera 218 integrated therewith, and may operate to store and/or process video and/or audio produced by the video camera 218 and/or transmit the captured video and/or audio as a video and/or audio stream to the portable radio 202 and other mobile computing devices for further analysis. An omni-directional or unidirectional microphone (not shown), or an array thereof, may be integrated in the video camera 218 and/or at the mobile communication device 216 (or additionally or alternatively made available at a separate location of the vehicle 214) and communicatively coupled to the mobile communication device 216 and/or vehicular transceiver 220 for capturing audio and storing, processing, and/or transmitting the audio in a same or similar manner to the video as set forth above. The omni-directional or unidirectional microphone, or an array thereof, may be integrated in the video camera 218 and/or at the mobile communication device 216 (or additionally or alternatively made available at a separate location of the vehicle 214) and communicably coupled to the mobile communication device 216 and/or vehicular transceiver 220 for capturing audio and storing, processing, and/or transmitting the audio in a same or similar manner as set forth above with respect to the RSM 204.

The vehicle 214 may be a human-operable vehicle, or may be a self-driving vehicle operable under control of the mobile communication device 216 perhaps in cooperation with video camera 218 (which may include a visible-light camera, an infrared camera, a time-of-flight depth camera, and/or a light detection and ranging (LiDAR) device). Command information and/or status information such as location and speed may be exchanged with the self-driving vehicle via the VAN and/or the PAN (when the PAN is in range of the VAN or via the VAN's infrastructure RAN link). In some embodiments, devices within the vehicle 214 may communicate with devices in other vehicles via a Vehicular to Vehicular (V2V) Network.

The vehicle 214 and/or transceiver 220, similar to the portable radio 202 and/or respective receivers, transmitters, or transceivers thereof, may include a location (and/or orientation) determination device integrated with or separately disposed in the mobile communication device 216 and/or transceiver 220 for determining (and storing and/or transmitting) a location (and/or orientation) of the vehicle 214.

In some embodiments, instead of a vehicle 214, a land, air, or water-based drone with the same or similar audio and/or video and communications capabilities and the same or similar self-navigating capabilities as set forth above may be disposed, and may similarly communicate with the user's 130 PAN to support the user 130 in the field.

The VAN may communicatively couple with the PAN disclosed above when the VAN and the PAN come within wireless transmission range of one another, perhaps after an authentication takes place there between. In some embodiments, one of the VAN and the PAN may provide infrastructure communications to the other, depending on the situation and the types of devices in the VAN and/or PAN and may provide interoperability and communication links between devices (such as video cameras) and sensors within the VAN and PAN.

Although the RSM 204, the laptop 206, and the vehicle 214 are illustrated in FIG. 2 as providing example video cameras and/or microphones for use in capturing audio and/or video streams, other types of cameras and/or microphones could be used as well, including but not limited to, fixed or pivotable video cameras secured to lamp posts, automated teller machine (ATM) video cameras, other types of body worn cameras such as head-mounted cameras, other types of vehicular cameras such as roof-mounted cameras, or other types of audio and/or video recording devices accessible via a wired or wireless network interface same or similar to that disclosed herein.

In some embodiments, one or more of the user 130, the vehicle 214, the portable radio 202, the RSM video capture device 204, and any other device in FIG. 2 may be equipped with an environmental sensor such as a chemical, biological, radiological, nuclear, or explosive (CBRNE) sensor. Measurements made by the CBRNE sensor may be stored locally or transmitted via a transmitter or transceiver to other mobile communication devices.

Finally, although FIG. 2 describes a user 130 generally described as a police officer and a vehicle 214 generally described as a police cruiser, in other embodiments, the system 100 may additionally or alternatively include a user 130 that may be an employee of a retailer and a vehicle 214 that may be a vehicle for use by the user 130 in furtherance of the employee's retail duties (for example, a shuttle or self-balancing scooter). In other embodiments, the system 100 may additionally or alternatively include a user 130 that may be an employee of a warehouse and a vehicle 214 that may be a vehicle for use by the user 130 in furtherance of the employee's retail duties (for example, a forklift). In still further embodiments, the system 100 may additionally or alternatively include a user 130 that may be an employee of a private security company and a vehicle 214 that may be a vehicle for use by the user 130 in furtherance of the private security employee's duties (for example, a private security vehicle or motorcycle). In even further embodiments, the system 100 may additionally or alternatively include a user 130 that may be a doctor or nurse of a hospital and a vehicle 214 that may be a vehicle for use by the user 130 in furtherance of the doctor or nurse's duties (for example, a medical gurney or ambulance). In still another example embodiment, the system 100 may additionally or alternatively include a user 130 that may be a miner, driller, or extractor at a mine, oil field, or precious metal or gem field and a vehicle 214 that may be a vehicle for use by the user 130 in furtherance of the miner, driller, or extractor's duties (for example, an excavator, bulldozer, crane, front loader). Other possibilities exist as well.

Referring back to FIG. 1, an incident location 140 is shown and refers to a location at which an incident has occurred such as theft, a medical emergency, a suspected drug infraction, or some other actual or expected event (e.g., such as a suspicious character or someone potentially matching a wanted suspect profile). The incident location 140 may be a location of a first user 130-1 and first mobile computing device 110-1 detected via a global positioning system (GPS) or triangulation method, or other technical locationing solution, at the first mobile computing device 110-1. Additionally, or alternatively, the incident location 140 may be separate or distant from the first user 130-1 and/or first mobile computing device 110-1 location and entered at the first mobile computing device 110-1 via a user interface of the first mobile computing device 110-1. For example, the first user 130-1 may be holding his or her first mobile computing device 110-1 and witness an explosion several hundred meters away or may witness a theft occurring across a street, among other possibilities. An example incident scene illustrating an explosion of a vehicle 150 and an injured person 160 at the incident location 140 is shown in FIG. 1.

The system 100 further includes a camera 170 which may be a surveillance camera that is shown in FIG. 1 as being separately deployed near the incident location 140. Alternatively, the camera 170 may be an integrated camera that is implemented at one or more mobile computing devices 110 (e.g., video camera 228 or vehicular video camera 218 shown in FIG. 2) that are associated with the first user 130-1. The camera 170 captures incident data, for example, image or video data corresponding to the explosion of the vehicle 150 and the injured person 160 at the incident location 140. The incident data captured at the camera 170 may be provided to a first mobile computing device 110-1 associated with the first user 130-1, for example via a direct-mode wireless air-interface link 120-3. Although FIG. 1 illustrates that an image or video data is captured at the incident location 140, various other types of data capturing devices/sensors (e.g., microphone) may be deployed at the incident location 140 and may be used to capture different forms (e.g., audio data) of incident data at the incident location 140.

In accordance with some embodiments, the first mobile computing device 110-1 determines one or more digital-assistant tasks that are needed to be executed based on the incident data obtained from the camera 170. In response to this determination, the first mobile computing device 110-1 automatically (or based on input from the user 130-1) requests capabilities of digital assistants implemented by other mobile computing devices, for example, a second mobile computing device 110-2 and a third mobile computing device 110-3, and further instructs one or more of the second and third mobile computing devices 110-2, 110-3 to execute a digital-assistant task based on the capabilities of digital assistants implemented by respective mobile computing devices 110-2, 110-3. In FIG. 1, the users 130-1, 130-2, and 130-3 are shown as public safety personnel each associated with a different public safety agency, and therefore the digital-assistant capabilities (which may be further determined based on user 130 capabilities and device 110 capabilities) associated with each user 130 and device 110 may be different. For example, in FIG. 1, the user 130-1 witnessing the incident and/or receiving incident data captured at the incident location 140 via the first mobile computing device 110-1, is shown as a police officer. The user 130-2 is shown as a fireman and the user 130-3 is shown as a medic, and therefore the digital-assistant capabilities of digital assistants respectively implemented at the mobile computing devices 110-2 and 110-3 may differ from each other, and may be further derived based on the capabilities (e.g., role, skill level) of the respective users 130-2, 130-3 and capabilities (e.g., battery condition, processing speed, software/hardware functions) of the respective mobile computing devices 110-2 and 110-3.

As used herein, the term "digital assistant" refers to electronic digital assistants (or sometimes referenced as "virtual partners") that may provide the user thereof with valuable information in an automated (for example, without further user input) or semi-automated (for example, with some further user input) fashion. The valuable information provided to the user may be based on explicit requests for such information posed by the user via an input (for example, such as a parsed natural language input or an electronic touch interface manipulation associated with an explicit request) in which the electronic digital assistant may reactively provide such requested valuable information, or may be based on some other set of one or more context or triggers in which the electronic digital assistant may proactively provide such valuable information to the user absent any explicit request from the user.

Figure 3:
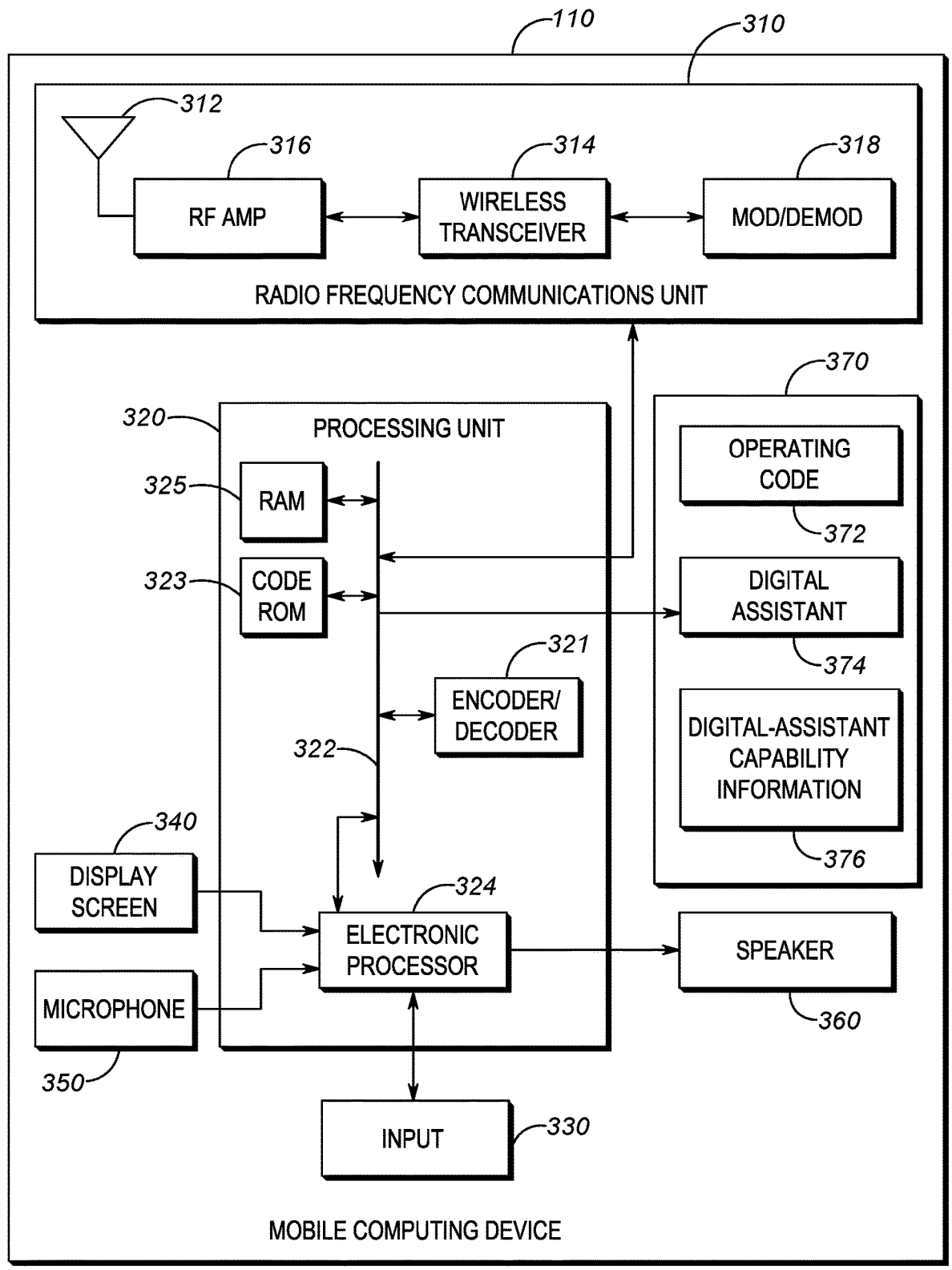
FIG. 3 is a device diagram showing a device structure of a mobile computing device of the system of FIG. 1 in accordance with some embodiments.

The mobile computing devices 110-1, 110-2, and 110-3 may be same or similar to the device diagram showing a device structure of a mobile computing device 110 as set forth in FIG. 3. FIG. 3 is an example functional block diagram of a mobile computing device 110 operating within the system 100 in accordance with some embodiments. While FIG. 3 represents a mobile computing device 110 described above with respect to FIGS. 1 and 2, depending on the type of mobile computing device 110, the mobile computing device 110 may include fewer or additional components in configurations different from that illustrated in FIG. 3.

As shown in FIG. 3, the mobile computing device 110 includes a radio frequency communications unit 310 coupled to a common data and address bus 322 of a processing unit 320. The mobile computing device 110 may also include an input 330 and a display screen 340, each coupled to be in communication with processing unit 320. The input 330 may include an alphanumeric physical keypad (or virtual keypad in cooperation with capacitive touch display screen 340) for inputting text for communications. In some embodiments, the input 330 may include a push-to-talk (PTT) key that functions to activate a transmit function in a half or full-duplex communication device, transitioning the mobile computing device 110 (when activated) from a listen-only mode to a transmit-only mode (for half-duplex communication devices) or transmit and receive mode (for full-duplex communication devices). The display screen 340 may further function to display communications (for example, incident data) received via communications unit 310. A microphone 350 captures speech input from a user 130 that is further vocoded by processing unit 320 and transmitted as voice, text, or multimedia data by communications unit 310 to other communication devices such as mobile computing devices 110 in system 100. A communications speaker 360 reproduces audio that is decoded from voice data transmissions received from other communication devices (e.g., mobile computing devices 110) via the communications unit 310.

The processing unit 320 may also include an encoder/decoder 321 with an associated code Read Only Memory (ROM) 323 for storing data for initializing system components and encoding and/or decoding voice or other traffic information (including image data, audio data, video data, text data, control signals, etc.) that may be transmitted or received by the mobile computing device 110. The processing unit 320 may further include an electronic processor 324 coupled, by the common data and address bus 322, to the encoder/decoder 321, a random access memory (RAM) 325, and a static memory 370.

The radio frequency communications unit 310 is a combined receiver and transmitter (e.g., transceiver) having a common antenna 312. The radio frequency communications unit 310 has a transceiver 314 coupled to the antenna 312 via a radio frequency amplifier 316. The transceiver 314 may be a transceiver operating in accordance with one or more standard protocols, such as a digital mobile radio (DMR) transceiver, a Project 25 (P25) transceiver, a terrestrial trunked radio (TETRA) transceiver, a Bluetooth transceiver, a long term evolution (LTE) transceiver, a Wi-Fi transceiver perhaps operating in accordance with an IEEE 802.11 standard (e.g., 802.11a, 802.11b, 802.11g), a WiMAX transceiver perhaps operating in accordance with an IEEE 802.16 standard, and/or other similar type of wireless transceiver configurable to communicate via a wireless network. The transceiver 314 is also coupled to a combined modulator/demodulator (MOD/DEMOD) 318 that is coupled to the encoder/decoder 321.

The electronic processor 324 has ports for coupling to the input 330 and to the display screen 340. The electronic processor 324 further has ports for coupling to the microphone 350 and to the speaker 360. The electronic processor 324 may include a microprocessor, a logic circuit, an application-specific integrated circuit (ASIC), a field-programmable gate array (FPGA), or another suitable electronic device. In some embodiments, the static memory 370 may store operating code 372 for the electronic processor 324 that, when executed by the electronic processor 324, perform one or more of the operations set forth in the figures and accompanying text. Static memory 370 may comprise, for example, a hard disk drive (HDD), an optical disk drives (ODD) such as a compact disk (CD) drive or digital versatile disc (DVD) drive, a solid-state drive (SSD), a tape drive, a flash memory drive, or a tape drive, to name a few.

In accordance with some embodiments, the static memory 370 further comprises a digital assistant 374 that is implemented at the mobile computing device 110. The digital assistant 374 may be a software application running on underlying electronic hardware (e.g., electronic processor 324) that is capable of understanding natural language (i.e., processing unstructured inputs/data) and may complete electronic digital-assistant tasks in response to user voice inputs, detection of a contextual situation (for example, detection of an incident at the incident location 140 based on processing the incident data), instructions received from other devices, among other additional or alternative type of inputs. The digital assistant 374 may include natural language processing (NLP) engine configured to determine the intent and/or content of an unstructured input, for example, an oral query received from a user of the mobile computing device 110. Based on the intent and/or content of the input, the digital assistant 374 may perform one or more of digital-assistant tasks which may include among other things, requesting digital assistants implemented at other computing devices, whether associated with the same or different user, to execute one or more digital-assistant tasks that are assigned based on their capabilities.

In accordance with some embodiments, the mobile computing device 110 further stores digital-assistant capability information 376 that identifies one or more capabilities of the digital assistant 374 implemented at the mobile computing device 110. In some embodiments, the information 376 may also include digital-assistant capability information received from other mobile computing devices (for example, devices 110-2 and 110-3) implementing respective digital assistants. In accordance with some embodiments, other mobile computing devices, for example, the second and third mobile computing devices 110-2, 110-3 transmit digital-assistant capability information 376 to the first mobile computing device 110-1 in response to wirelessly receiving a request for digital-assistant capability information from the first mobile computing device 110-1. The one or more capabilities of the digital assistant 374 is determined and stored at the respective mobile computing devices 110 based on one or more of: device capability, software capability, and network capability associated with the mobile computing device implementing the respective digital assistant; current location of the mobile computing device; type and capability of accessories/devices/sensors (for example, as shown in FIG. 2) that are communicatively coupled to the mobile computing devices implementing the respective digital assistants; user profile including information related to one of role, skill level, and historical data associated with a user of the mobile computing devices; and information associated with one or more equipment assigned to the user of the mobile computing devices.

In accordance with some embodiments, the digital-assistant task assigned to the second mobile computing device 110-2 is determined based on the digital-assistant capability information 376 received from the second mobile computing device 110-2. The first mobile computing device 110-1 determines whether the digital-assistant capability information 376 received from the second mobile computing device 110-2 identifies one or more capabilities needed to execute a given digital-assistant task and further assigns the given digital-assistant task to the second mobile computing device 110-2 only when the corresponding digital-assistant capability information 376 identifies one or more capabilities needed to execute the given digital-assistant task.

In accordance with some embodiments, the digital-assistant task may be selected from one or more of: a first task requesting the respective digital assistant to perform an analytics (e.g., audio and/or video analytics) on at least one portion of the incident data and identify, based on the performed analytics, a condition or a status of a person, object, or entity (POE), and further determine a type of entity (e.g., user or equipment) that is needed to be dispatched to a location of the incident (e.g., incident location 140) based on the condition or status of the POE; a second task requesting the respective digital assistant to determine if a profile of an entity associated with the mapped one or more of the plurality of other mobile computing devices implementing the respective digital assistant matches with a type of entity that is needed to be dispatched to a location of the incident; a third task requesting the respective digital assistant to generate an electronic dispatch request to be provided at the mobile computing device when a profile of an entity associated with the mapped one or more of the plurality of other mobile computing devices matches with a type of entity that is needed to be dispatched to a location of the incident, the electronic dispatch request providing a response mechanism for a user of the mapped one or more of the plurality of other mobile computing devices to accept or decline the electronic dispatch request; and a fourth task requesting the respective digital assistant to generate an electronic task report identifying one or more of status of a completion of the task, information related to one or more entities to be dispatched to a location of the incident, established time of arrival of the one or more entities, and a condition or status of a POE that is identified from the at least one portion of the incident data. Other possibilities of digital-assistant tasks exist as well.

Figure 4:
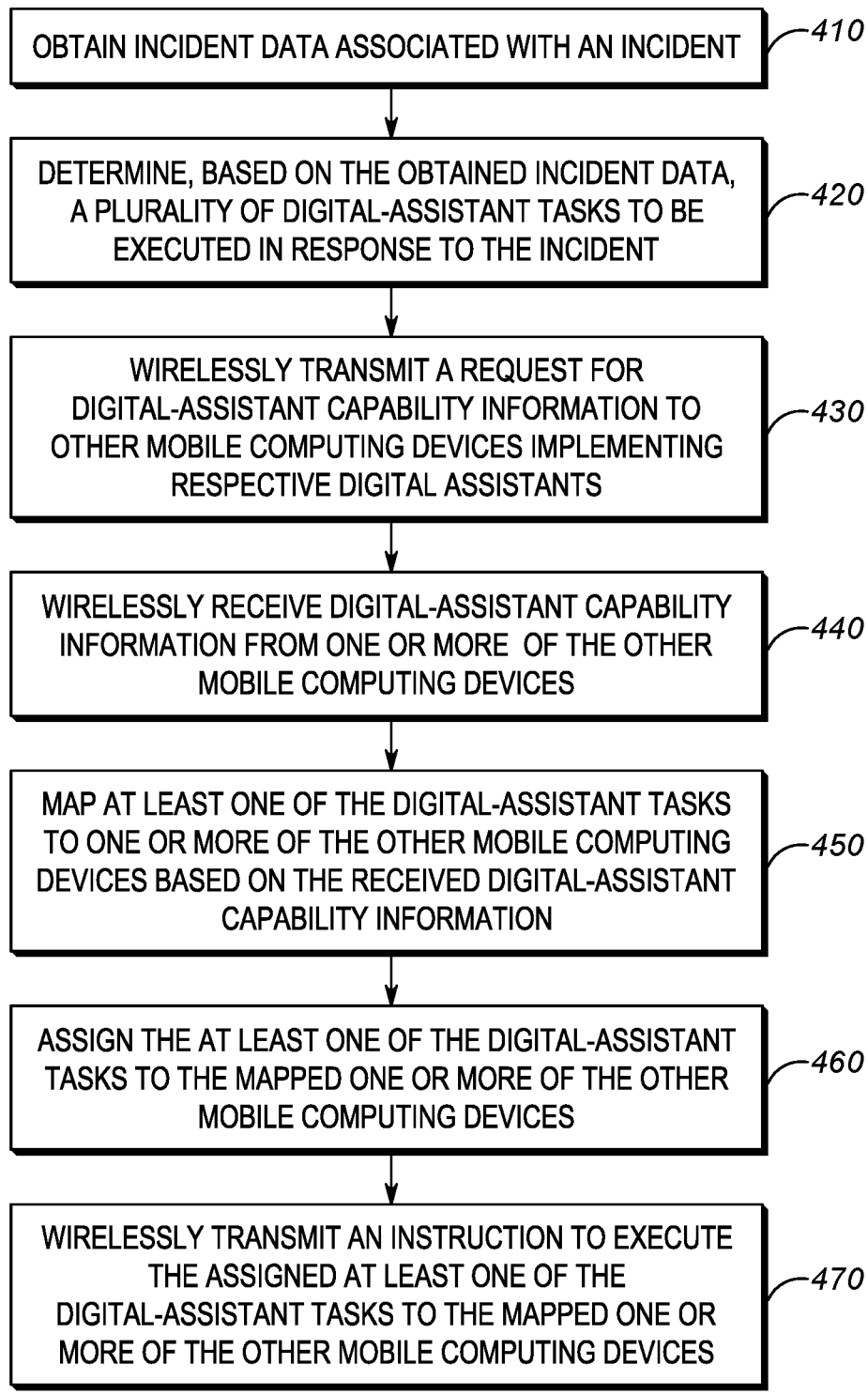
FIG. 4 illustrates a flow chart of a method of assigning a digital-assistant task to a mobile computing device in response to an incident in accordance with some embodiments.

FIG. 4 illustrates a flow chart diagram of a method 400 for assigning a digital-assistant task to a mobile computing device in response to an incident. While a particular order of processing steps, message receptions, and/or message transmissions is indicated in FIG. 4 as an example, timing and ordering of such steps, receptions, and transmissions may vary where appropriate without negating the purpose and advantages of the examples set forth in detail throughout the remainder of this disclosure. The method 400 shown in FIG. 4 can be performed by one or more components of a first mobile computing device 110-1, and will be described with reference to the functions and components of the system 100. Some of the features described in the method 400 may be performed by the digital assistant 374 using underlying hardware such as an electronic processor 324 implemented at the first mobile computing device 110-1.

At block 410, the first mobile computing device 110-1 obtains incident data associated with an incident. The first mobile computing device 110-1 may obtain incident data such as raw unprocessed video data captured by the camera 170 at the incident location 140. In one embodiment, the first mobile computing device 110-1 wirelessly receives the incident data directly from the camera 170 (or other suitable incident data source deployed at the incident location 140) via the direct-mode wireless air-interface link 120-3. In other embodiments, the incident data is directly captured by a video camera (e.g., video camera 228 or vehicular video camera 218) implemented at the first mobile computing device 110-1. In further embodiments, the first mobile computing device 110-1 may wirelessly receive the incident data from another user, such as another officer or civilian at the incident location 140. The obtained video data may include multiple segments (frames) of data each respectively capturing one or more of persons, objects, or entities (POE) of interest. In the example shown in FIG. 1, the video data captured by the camera 170 may include a first set of one or more segments of video data that identifies an explosion of a vehicle 150 and a second set of one or more segments of video data that identifies an injured person 160. In other embodiments, the incident data may include text data, audio data, or other forms of multimedia data.

At block 420, the first mobile computing device 110-1 determines, based on the obtained incident data, a plurality of digital-assistant tasks to be executed in response to the incident. In some embodiments, this determination may be performed by the digital assistant 374 implemented at the first mobile computing device 110-1. The first mobile computing device 110-1 may identify one or more of POEs of interest from the incident data. For example, the first mobile computing device 110-1 may process the video data using object recognition algorithms (e.g., using object classifiers) to recognize one or more POEs of interest from the video data. In addition, the first mobile computing device 110-1, depending on its own capabilities identified in the digital-assistant capability information 376 may perform a digital-assistant task, for example, to further identify a status or condition of the identified POEs. For example, the first mobile computing device 110-1 processes the video data to detect POEs such as a vehicle 150 and a person 160. In the example shown in FIG. 1, the first mobile computing device 110-1 may detection the condition of the vehicle 150 as being under 'fire' and further the condition of the person 160 as being 'injured'. Accordingly, based on the detected conditions associated with the two separate POEs of interest, the first mobile computing device 110-1 may determine that the 'fire' in the vehicle 150 needs to be controlled and further the 'injured' person 160 needs medical attention. Based on this determination, the first mobile computing device 110-1 automatically generates a first dispatch task based on the condition of the vehicle 150 and a second dispatch task based on the condition of the person 160. For example, the first dispatch task may require that an available responder with an assigned role of a 'fireman' (and with corresponding fire equipment) needs to be assigned to respond to the vehicle 150 under explosion. Similarly, the second dispatch task may require that an available responder with an assigned role of a 'medic' (and with assigned tools) needs to be assigned to respond to the injured person 160. In some cases, the first mobile computing device 110-1 itself may be able to perform the assigned tasks if the digital-assistant capability information 376 identifies that it has capabilities (for example, it already has contact numbers of fireman and medic that are available and located nearby). However, in other cases, when the first mobile computing device 110-1 is unable to perform the digital-assistant tasks and further unable to communicate with a dispatcher (because of network issues), the first mobile computing device 110-1 may need to communicate with other mobile computing devices (e.g., devices 110-2, 110-3 that are within its transmission range) to determine if one or more other mobile computing devices are capable of performing the digital-assistant tasks such as the first and second dispatch tasks.

In one embodiment, the function described at block 420 is performed only when the first mobile computing device 110-1 is unable to coordinate with dispatcher to request resources for providing better aid at the incident location 140. In other words, in this embodiment, the first mobile computing device 110-1, by default, attempts to communicate the obtained incident data to a dispatcher (via a dispatch server) in order to request for resources for responding to the incident. However, when the first mobile computing device 110-1 is unable to communicate with the dispatcher, for example, due to poor network coverage or network failure, the first mobile computing device 110-1 automatically proceeds to perform the rest of the functions as described in blocks 420 through 470 of FIG. 4.

Next, at block 430, the first mobile computing device 110-1 wirelessly transmits a request for digital-assistant capability information to other mobile computing devices implementing respective digital assistants. For example, the first mobile computing device 110-1 transmits a separate request for digital-assistant capability information to each of the second and third mobile computing devices 110-2, 110-3 via direct-mode wireless air-interface links 120-1, 120-2, respectively. In other words, the first mobile computing device 110-1 establishes a direct-mode wireless connection with each of the second and third mobile computing devices 110-2, 110-3 to transmit the request for digital-assistant capability information. In one embodiment, the first mobile computing device 110-1 may transmit the request for digital-assistant capability information prior to determining digital-assistant tasks at block 420 and/or prior to obtaining incident data at block 410. In other embodiments, the first mobile computing device 110-1 may transmit the request for digital-assistant capability information after determining the digital-assistant tasks that are needed to be executed in response to incidents. In further embodiments, the first mobile computing device 110-1 may transmit the request for digital-assistant capability information after determining that its own digital-assistant capabilities as identified from the digital-assistant capability information 376 are not sufficient to execute one or more of the plurality of the digital-assistant tasks determined at block 420. In one embodiment, the request for digital-assistant capability information specifies the type of capabilities (e.g., video data analytics, speech to text recognition capabilities, dispatch capabilities, associated user role or skill etc.,) that may be required to carry out one or more of the digital-assistant tasks determined at block 420.

At block 440, the first mobile computing device 110-1 wirelessly receives digital-assistant capability information 376 from one or more of the other mobile computing devices. For example, the first mobile computing device 110-1 receives respective digital-assistant capability information 376 from each of the second and third mobile computing devices 110-2 and 110-3. The digital-assistant capability information 376 received from the second and third mobile computing devices 110-2 and 110-3 respectively identifies capabilities of the digital-assistants implemented at the respective devices 110-2 and 110-3. The digital-assistant capability information 376 includes information related to one or more of: device capability, software capability, and network capability associated with the mobile computing device implementing the respective digital assistant; current location of the mobile computing device; type and capability of accessories/devices that are communicatively coupled to the other mobile computing devices implementing the respective digital assistants; user profile including information related to one of role, skill level, and historical data associated with a user of the other mobile computing devices; and information associated with one or more equipment assigned to the user of the other mobile computing devices.

In accordance with some embodiments, the device capability may include information related to type of hardware components implemented at the mobile computing devices 110 and their corresponding capabilities. For example, the device capability may specify that the device has integrated sensors (such as camera, microphone, and heart rate sensor) that may allow the device to capture additional information related to the incident at the incident location 140. The device capability may include information related to charge level of the battery of the second mobile computing device 110-2. The charge level of the battery may be an indicator for the first mobile computing device 110-1 to determine whether to assign a digital-assistant task to a mobile computing device 110. The device capability may include information related to speed of a hardware processor of a mobile computing device, number of current tasks being processed and/or in queue to be processed, priority level of the current tasks, and the like. The software capability may include a list of software applications and their corresponding capabilities. For example, the software capability may indicate that the device is capable of performing speech to text conversion, video data analytics, NLP processing, object recognition, etc. The network capability may indicate the type of available network connection for example, narrowband or broadband connection, and the device's capability to further propagate assigned digital-assistant tasks to one or more other mobile computing device, for example, via ad-hoc routing.

In accordance with some embodiments, the digital-assistant capability information 376 received from the second mobile computing device 110-2 may identify that the second mobile computing device 110-2 is assigned to a user 130-2 having a role of 'fireman', and further the digital-assistant of the mobile computing device 110-2 is capable of processing incident data (e.g., video data via an object recognition algorithm or based on the input from the associated user 130-2) and further assign the user 130-2 to be dispatched to the incident location based on the user 130-2 capability to respond to a particular type of incident. Similarly, the digital-assistant capability information 376 received from the mobile computing device 110-3 may identify that the mobile computing device 110-3 is assigned to a user 130-2 having a role of 'medic', and further the digital-assistant of the third mobile computing device 110-3 is capable of processing incident data (e.g., video data via an object recognition algorithm or based on the input from the associated user 130-3) and further assign the user 130-3 to be dispatched to the incident location based on the user 130-3 capability to respond to a particular type of incident.

At block 450, the first mobile computing device 110-1 maps at least one of the digital-assistant tasks determined at block 420 to one or more of the mobile computing devices based on the received digital-assistant capability information 376. For example, the first mobile computing device 110-1 may map a first digital-assistant task determined at block 420 to the second mobile computing device 110-2 based on the digital-assistant capability information 376 received from the second mobile computing device 110-2. If the first digital-assistant task determined at block 420 requires that an available responder with an assigned role of a 'fireman' (and with corresponding fire equipment) needs to be assigned to respond to the vehicle 150 under explosion, then the first mobile computing device 110-1 may map the first digital-assistant task to the second mobile computing device 110-2 because digital-assistant capability information 376 received from the second mobile computing device 110-2 identifies that user 130-2 has a role of a 'fireman' and further is available to be dispatched to the incident location 140 to respond to the vehicle 150 under explosion. Similarly, the first mobile computing device 110-1 may map a second digital-assistant task determined at block 420 to the third mobile computing device 110-3 based on the digital-assistant capability information 376 received from the third mobile computing device 110-3, where the digital-assistant capability information 376 indicates that user 130-3 has a role of a 'medic' and further is available to be dispatched to the incident location 140 to attend to the injured person 160 as required by the second digital-assistant task.

In accordance with some embodiments, the first mobile computing device 110-1 may map a given digital-assistant task to more than one mobile computing device. Assume that the digital-assistant task is to identify all objects of interest in the incident data captured at the incident location 140 and both mobile computing devices 110-2 and 110-3 are capable of performing video analytics, for example, to recognize an object from the video data captured at the incident location 140. In this case, the first mobile computing device 110-1 may map the digital-assistant task of performing video analytics to both mobile computing devices 110-2 and 110-3. For example, such a mapping (which may be stored at the static memory 370) may be similar to that set forth in Table I:

TABLE I

Example mapping of digital-assistant tasks to mobile computing devices

| Digital-Assistant Task | Identity of Mapped Device |
|---|---|
| Video analytics | Second Mobile Computing Device 110-2 |
| Video analytics | Third Mobile Computing Device 110-3 |
| Dispatch a fireman | Second Mobile Computing Device 110-2 |
| Dispatch a medic | Third Mobile Computing Device 110-3 |

In the above example, assume that the first mobile computing device 110-1 determines a video analytics task to be performed on the video data captured at the incident location 140 and further a dispatch task to assign a medic and a fireman to respond to the incident. Based on the digital-assistant capability information 376 received at block 440, the first mobile computing device 110-1 determines that the video analytics task can be mapped to both second and third mobile computing devices 110-2 and 110-2 as both second and third mobile computing devices 110-2, 110-3 are capable of performing video analytics. Further, the first mobile computing device 110-1 determines that the dispatch task to assign a fireman to the incident can be mapped to only the second mobile computing device 110-2 because only the second mobile computing device 110-2 is associated with a user having the role of a 'fireman'. Similarly, the first mobile computing device 110-1 determines that the dispatch task requesting to assign a medic can be mapped to only the third mobile computing device 110-3 because only the third mobile computing device 110-3 is associated with a user having the role of a 'medic'.

At block 460, the first mobile computing device 110-1 assigns the at least one of the digital-assistant tasks to the mapped one or more of the other mobile computing devices. For example, the first mobile computing device 110-1 assigns the video analytics task to both first and second mobile computing devices 110-2, 110-3 based on the mapping shown in Table I. Similarly, the first mobile computing device 110-1 assigns a first dispatch task to request to assign a fireman to the second mobile computing device 110-2, and a second dispatch task to request to assign a medic to the third mobile computing device 110-3 based on the mapping shown in table I. In accordance with some embodiments, the first mobile computing device 110-1 marks the assignment status for each of the plurality of digital-assistant tasks determined at block 320 as 'Assigned' or 'Not assigned'. The assignment status may be used to track the assignment for each such digital-assistant task determined at block 420. For example, such a mapping (which may be stored at the static memory 370) may be similar to that set forth in Table II shown below:

TABLE II

Example assignment status and distribution of video segments for digital-assistant tasks.

| Digital-Assistant Task | Identity of Mapped Device | Distribution of Video Segments | Assignment Status |
|---|---|---|---|
| Video analytics | Second Mobile Computing Device 110-2 | Frames 1-4 (identifying vehicle under explosion) | Assigned |
| Video analytics | Third Mobile Computing Device 110-3 | Frames 5-8 (identifying injured person) | Assigned |
| Dispatch a fireman | Second Mobile Computing Device 110-2 | Frames 1-4 (identifying vehicle under explosion) | Assigned |
| Dispatch a medic | Third Mobile Computing Device 110-3 | Frames 5-8 (identifying injured person) | Assigned |

Further, in some embodiments, the first mobile computing device 110-1 may distribute different segments of video data while assigning different digital-assistant tasks to different mobile computing devices. For example, such a distribution of video segments and the corresponding mapping of digital-assistant tasks to the respective mobile computing devices may be similar to that set forth in Table II above.

The video data captured at the incident location 140 may need to further analyzed using video analytics algorithms, for example, to identify a condition/status of a vehicle 150 or an injured person 160. In accordance with some embodiments, the first mobile computing device 110-1 may distribute different portions of video data to different mobile computing devices for performing video analytics based on the digital-assistant capability information 376 received from the mobile computing device. As shown in the mapping of Table I, both second and third mobile computing devices 110-2, 110-3 are capable of performing video analytics. However, the first mobile computing device 110-1, instead of sending the entire portion of video data to both second and third mobile computing devices 110-2 and 110-3, may only send specific segments of interest that are of relevant to each mobile computing device further based on digital-assistant capabilities. For example, as shown in Table II, the first mobile computing device 110-1 may determine that frames 1-4 include visual information identifying the vehicle 150 under explosion and frames 3-8 include visual information identifying the injured person 160. In this case, the first mobile computing device 110-1 assigns the video analytics task to the second mobile computing device 110-2 specifically for frames 1-4, and further assigns the video analytics task to the third mobile computing device 110-3 specifically for frames 3-8.

At block 470, the first mobile computing device 110-1 wirelessly transmits an instruction to execute the assigned at least one of the digital-assistant tasks to the mapped one or more of the mobile computing devices. In accordance with some embodiments, the instruction may correspond to one or more of: a video analytics task, a dispatch task, and a reporting task. The instructions may further include one or more of: information related to an assigned task; a priority level with which the assigned task is to be executed; and one or portions of incident data (e.g., video, audio, or text data) that are relevant for executing the assigned task.

For example, the first mobile computing device 110-1 transmits an instruction to the second mobile computing device 110-2 via the direct-mode wireless air-interface link 120-1 to request the second mobile computing device 110-2 to execute the video analytics task and an instruction to the third mobile computing device 110-3 via the direct-mode wireless air-interface link 120-2 to request the third mobile computing device 110-3 to execute the video analytics task.

The instructions sent to the second and third mobile computing devices 110-2, 110-3 for video analytics task may include information related to one or more functions that may need to be performed in order for the execution or completion of the video analytics task assigned to the second mobile computing device 110-1. The functions may identify type of video analytics task (e.g., identify POE in the video data, identity a status or condition of the POE in the video data, run the license plate of the vehicle 150 identified in the video data, check the criminal status of a person 160 identified in the video data etc.) and corresponding information to be reported back to the first mobile computing device 110-1. The instruction may further include frames of video data for which video analytics need to be performed. For example, frames numbered 1-4 of the video data are sent to second mobile computing device 110-2 for performing video analytics task and frames numbered 5-8 of the video data are sent to third mobile computing device 110-3 for performing video analytics task. In accordance with some embodiments, such video (and/or audio) analytics may be performed using one or more machine learning algorithms which may include, but are not limited to: a generalized linear regression algorithm; a random forest algorithm; a support vector machine algorithm; a gradient boosting regression algorithm; a decision tree algorithm; a generalized additive model; neural network algorithms, deep learning algorithms, evolutionary programming algorithms, and the like, depending on the digital-assistant capability.

As a further example, the instructions for the dispatch tasks to request to assign a fireman and medic to respond to the incident are respectively transmitted to the second mobile computing device 110-2 and third mobile computing device 110-3. The instructions for the dispatch tasks respectively transmitted to the second and third mobile computing devices 110-2, 110-3 may include one or more functions that are needed to be performed at the respective devices 110-2, 110-3 in order for the execution or completion of the respective task assigned to the second and third mobile computing devices 110-2, 110-3. The functions, for example, include a request to the digital assistant 374 to generate an electronic dispatch request to be provided (e.g., via the display screen 340 or via the speaker 360) at the respective mobile computing devices 110-2, 110-3 when a profile (e.g., 'medic' or 'fireman') of an entity (i.e. of users 130-2, 130-3 and/or equipment assigned to the users 130-2, 130-3) associated with the respective mobile computing devices 110-2, 110-3 matches with a type of entity (e.g., 'medic' or 'fireman') needed to be dispatched to the incident location 140. The functions may request that the generated electronic dispatch request provide for a response mechanism for the users 130-2, 130-3 of the respective mobile computing devices 110-2, 110-3, where the response mechanism allows the users 130-1, 130-2 to accept or decline the electronic dispatch request provided at the respective mobile computing devices 110-2, 110-3. In this example, the instruction may further include frames numbered 1-4 of the video data that are sent to second mobile computing device 110-2 and frames numbered 5-8 of the video data that are sent to third mobile computing device 110-3. For dispatch related task, in some embodiments, the instruction may further request the digital assistant 374 of respective mobile computing devices to perform video analytics task to first identify a condition or a status of a POE and further automatically identify a type of entity that is needed to be dispatched to the incident location 140. For example, the output of performing video analytics task at the second mobile computing device 110-2 may result in identifying that the vehicle door is jammed and therefore the digital assistant 374 of the second mobile computing device 110-2 may request the user 130-2 to bring equipment of a particular type to open the door.

In accordance with some embodiments, the instructions sent to the second and third mobile computing devices 110-2, 110-3 may further request the respective digital assistants to generate an electronic task report that identifies one or more of: status of completion of the task; information related to one or more entities to be dispatched to a location of the incident; established time of arrival of the one or more entities, and a condition or status of POE that is identified from the at least one portion (i.e., one or more identified video frames) of incident data.

Figure 5:
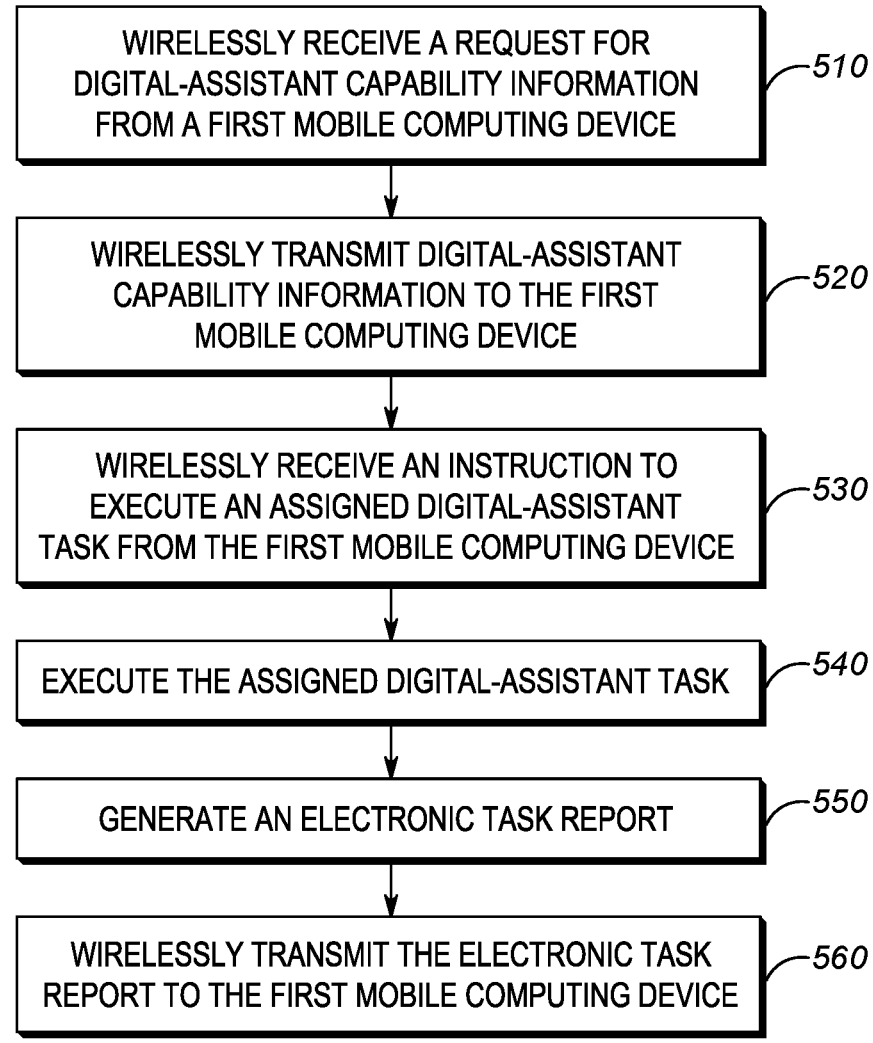
FIG. 5 illustrates a flow chart of a method of executing one or more assigned digital-assistant tasks at a mobile computing device in accordance with some embodiments.

In accordance with embodiments, the mobile computing devices, for example, devices 110-2 and 110-3, in response to receiving the instructions to execute an assigned digital-assistant task, process the instructions and executes the assigned digital-assistant task as shown in FIG. 5.

FIG. 5 illustrates a flow chart diagram of a method 500 for executing an assigned digital-assistant task. While a particular order of processing steps, message receptions, and/or message transmissions is indicated in FIG. 5 as an example, timing and ordering of such steps, receptions, and transmissions may vary where appropriate without negating the purpose and advantages of the examples set forth in detail throughout the remainder of this disclosure. The method 500 shown in FIG. 5 can be performed by one or more components of a second or third mobile computing devices 110-2, 110-3, and will be described with reference to the functions and components of the system 100. Some of the features described in the method 500 may be performed by the digital assistant 374 using underlying hardware such as an electronic processor 324 implemented at the second or third mobile computing devices 110-2, 110-3.

At block 510, the second mobile computing device 110-2 wirelessly receives a request for digital-assistant capability information from the first mobile computing device 110-1, for example, via the direct-mode wireless air-interface link 120-1. In one embodiment, the request for digital-assistant capability information specifies the type of capabilities (e.g., video data analytics, speech to text recognition capabilities, associated user role or skill etc.,) for which digital-assistant capability information 376 is requested.

At block 520, the second mobile computing device 110-2 wirelessly transmits digital-assistant capability information 376 to the first mobile computing device 110-1, via the direct-mode wireless air-interface link 120-1. The digital-assistant capability information 376 identifies capabilities of the digital-assistant implemented at the second mobile computing device 110-2. The digital-assistant capability information 376 includes information related to one or more of: device capability, software capability, and network capability associated with the mobile computing device implementing the respective digital assistant; current location of the mobile computing device; type and capability of accessories that are communicatively coupled to the mobile computing device implementing the digital assistant; user profile including information related to one of role, skill level, and historical data associated with a user of the mobile computing device; and information associated with one or more equipment assigned to the user of the mobile computing device.

In accordance with some embodiments, the digital-assistant capability information 376 may indicate type of analytics engine that is implemented at a given mobile computing device 110. For example, the analytics engine may correspond to an object classifier that can be used to detect person, object, or entity (POE) of interest from an image or video without requiring further input from the server. The object classifier, for example, evaluates an image or part of the image captured by the camera 170 to determine if an instance of the POE is detected or not. In some embodiments, the object classifiers may be trained using a training data set that may include, for example, images or other data with predetermined instances of POE of interest (for example, image data corresponding to a person that is captured at different locations) as well as examples of data showing what the POE is not. Different object classifiers may have different capability. For example, one object classifier may be able to process an image to identify a person wearing a blue shirt with a red hat and another object classifier may be able to process an image to check whether the person is in possession of a particular type of fire arm. Accordingly, depending on the type of analytics engine/object classifiers implemented at a mobile computing device 110, the digital-assistant capability may vary.

In accordance with some embodiments, the second mobile computing device 110-2 may obtain the digital-assistant capability information 376 from the static memory 370 of the second mobile computing device 110-2 in order to transmit the information requested at block 510. In some embodiments, if the digital-assistant capability information 376 is not already stored at the static memory 370 and/or if the information 376 stored at the static memory 370 has expired, then the second mobile computing device 110-2 generates digital-assistant capability information 376 based on a combination of one or more of: querying the user 130-2, extracting capabilities information from one or more databases (e.g., user profile, software applications profile, hardware profile etc.) stored at the static memory 370 or at other computing devices in a personal area network, and receiving information from other mobile computing devices 110 associated with the same user 130-2.

In accordance with some embodiments, the digital-assistant capability information 376 transmitted by the second mobile computing device 110-2 may identify that the second mobile computing device 110-2 is assigned to a user 130-2 having a role of a 'fireman'. It may also further identify that the digital-assistant of the second mobile computing device 110-2 is capable of performing video analytics on the incident data (e.g., video data) in order to identify a condition/status of a POE (e.g., automatically via an object recognition algorithm or manually by the associated user 130-2) and further assign the user 130-2 to be dispatched to the incident location based on the user 130-2 capability to respond to the condition of the POE.

Next, at block 530, the second mobile computing device 110-2 wirelessly receives, via the direct-mode wireless air-interface link 120-1, an instruction to execute an assigned digital-assigned task from the first mobile computing device 110-1. In accordance with some embodiments, the instruction received by the second mobile computing device 110-2 may correspond to one or more of: a video analytics task, a dispatch task, and a reporting task. The instructions may further include one or more of: information related to an assigned task; a priority level with which the assigned task is to be executed; and one or portions of incident data (e.g., video, audio, or text data) that are relevant for executing the assigned task.

For example, the instruction received by the second mobile computing device 110-2 for video analytics task may include information related to one or more functions that may need to be performed in order for the execution or completion of the video analytics task assigned to the second mobile computing device 110-2. The functions may identify type of video analytics task (e.g., identify POE in the video data, identity a status or condition of the POE in the video data, run the license plate of the vehicle identified in the video data, check the criminal status of a person identified in the video data etc.) and corresponding information to be reported back to the first mobile computing device 110-1. The instruction may further include frames of video data for which video analytics need to be performed. For example, frames numbered 1-4 of the video data obtained by the first mobile computing device 110-1 may be received at the second mobile computing device 110-2 for performing video analytics task.

As a further example, the instructions for the dispatch task may include a request to dispatch a fireman. The instruction for the dispatch task transmitted to the second mobile computing device 110-2 may include one or more functions that are needed to be performed at the second mobile computing device 110-2 in order for the execution or completion of the dispatch task assigned to the second mobile computing device 110-2. The functions, for example, include a request to the digital assistant 374 implemented at the second mobile computing device 110-2 to generate an electronic dispatch request to be provided (e.g., via the display screen 340 or via the speaker 360) at the second mobile computing device 110-2 when a profile (e.g., fireman) of an entity (i.e. of user 130-2 or equipment assigned to the user 130-2) associated with the second mobile computing device 110-2 matches with a type of entity (e.g., fireman) that is needed to be dispatched to the incident location 140. The functions may request that the generated electronic dispatch request provide for a response mechanism for the user 130-2 of the second mobile computing device, where the response mechanism allows the user 130-2 to accept or decline the electronic dispatch request provided at the respective mobile computing devices 110-2, 110-3. In this example, the instruction may further include frames numbered 1-4 of the video data that are received at the second mobile computing device 110-2. In accordance with some embodiments, the video data may be sent in a transmission that is separate from the instructions. For dispatch related task, in some embodiments, the instruction may further request the digital assistant 374 of respective mobile computing devices to perform video analytics task to first identify a condition or a status of a POE and further automatically identify a type of entity that is needed to be dispatched to the incident location 140. For example, performing video analytics task at the second mobile computing device 110-2 may result in identifying that the vehicle door is jammed and therefore the digital assistant 374 of the second mobile computing device 110-2 may request the user 130-2 to bring a special equipment to open the door.

In accordance with some embodiments, the instructions for reporting task may include a request to the digital assistant 374 implemented at the second mobile computing device 110-2 to generate an electronic task report that identifies one or more of: status of completion of the task; information related to one or more entities to be dispatched to a location of the incident; established time of arrival of the one or more entities, and a condition or status of POE that is identified from the at least one portion (i.e., one or more identified video frames) of incident data.

Next, at block 540, the second mobile computing device 110-2 executes the assigned digital-assistant task. In accordance with some embodiments, the assigned digital-assistant task is more specifically performed by the digital assistant 374 using underlying hardware implemented at the second mobile computing device 110-2 in accordance with the instructions received from the first mobile computing device 110-1.

In accordance with some embodiments, the second mobile computing device 110-2, prior to executing the assigned digital-assistant task, checks if it is able to execute the assigned digital-assistant task. For example, if a priority level of a received digital-assistant task is lower than respective priority levels of one or more digital-assistant tasks currently in queue or being processed at the second mobile computing device 110-2, then the second mobile computing device 110-2 may take an action to either process the currently received digital-assistant in accordance with its priority level or may send an acknowledgment, via the direct-mode wireless air-interface link 120-1, to the first mobile computing device 110-1 indicating that the assigned digital-assistant task will not executed by the second mobile computing device 110-2. In some embodiments, the second mobile computing device 110-2 may also consider other factors such as network conditions, processing load, battery level, and user input to determine whether it is able to execute the assigned digital-assistant task. On the other hand, if the second mobile computing device 110-2 determines that it is able to execute the assigned digital-assistant task, then the second mobile computing device 110-2 may send an acknowledgment, via the direct-mode wireless air-interface link 120-1, to the first mobile computing device 110-1 indicating that the assigned digital-assistant task will be executed by the second mobile computing device 110-1.

For example, if the instructions received at block 530 is for a video analytics task corresponding to frames numbered 1-4 of video data obtained by the first mobile computing device 110-1 at the incident location 140. The second mobile computing device 110-2 executes the video analytics task by processing the frames numbered 1-4 of video data, for example, using one or more object recognition algorithms, to identify one or more of: POE in the video data, identity a status or condition of the POE in the video data, run the license plate of a vehicle identified in the video data, check the criminal status of a person identified in the video data, and the like, depending on the type of video analytics task as specified in the instructions received at block 540.

As another example, if the instructions received at block 530 is a dispatch task to dispatch a first responder such as a fireman, then the second mobile computing device 110-2 performs the assigned dispatch task by first checking that the profile of the user 130-2 associated with the second mobile computing device 110-2 matches with the type of first responder requested in the dispatch task. Further, after determining that there is a match, the second mobile computing device 110-2 generates an electronic dispatch request which, for example, is displayed via the display screen 340 to allow the user 130-2 to either accept or decline the request via a response mechanism (e.g., by selecting graphical user interface button displayed on a touch screen) provided at the display screen 340. In other embodiments, the electronic dispatch request may also be audibly provided to the user 130-2, for example, via the speaker 360. In response, the user 130-2 may provide voice input (to be detected by the microphone 350) or via response mechanism provided at the display screen 340 to either accept or decline the electronic dispatch request.

In other embodiments, in response to receiving instructions to execute the dispatch task, the second mobile computing device 110-2 may automatically assign the user 130-2 to be dispatched to the incident location 140 for responding to the vehicle 150 under explosion based on a determination that the profile of the user 130-2 (i.e., fireman) matches with the requested type of responder. In these embodiments, the second mobile computing device 110-2 may also consider other parameters such as priority level of the assigned task and contextual factors (such as location of the user 130-2 relative to the incident location, user 130-2 availability (e.g., whether user is assigned to other incidents), resources available with the user 130-2 (e.g. tools/equipment) etc.) to determine whether the user 130-2 can be dispatched to the incident location 140.

Next, at block 550, the second mobile computing device 110-2 generates an electronic task report. The electronic task report is generated as a function of the assigned task and may include information related to one or more of: status of completion of the assigned task; information related to one or more entities to be dispatched to the incident location; established time of arrival of the one or more entities, and a condition or status of POE that is identified from the at least one portion (i.e., one or more identified video frames) of incident data.

Next, at block 560, the second mobile computing device 110-2 wirelessly transmits, via the direct-mode wireless air-interface link 120-1 the generated electronic task report to the first mobile computing device 110-1.

In accordance with some embodiments, if the second mobile computing device 110-2 determines that it is unable to perform the assigned digital-assistant task, (for example, when the priority level of the received task is lower than respective priority levels of one or more tasks in a processing queue or due to other factors such as network failure, processing overload condition, low battery level, task rejected by the user etc.,) the second mobile computing device 110-2 may forward/propagate the instructions received from the first mobile computing device 110-1 to one or more other mobile computing devices, such as a fourth mobile computing device (not shown) which may be in a direct-mode transmission range of the second mobile computing device 110-2. In this case, the fourth mobile computing device may not be in the direct-mode transmission range of the first mobile computing device 110-1 and therefore may not have received any instructions from the first mobile computing device 110-1 to execute a digital-assistant task. In these embodiments, the second mobile computing device may perform a similar method 400 as described in FIG. 4 to identify capabilities of the fourth mobile computing device that is within a direct-mode transmission range to the second mobile computing device 110-2 and further re-assign the digital-assistant task for execution by the digital assistant 374 implemented at the fourth mobile computing device. In this manner, the digital-assistant tasks can be propagated to other digital-assistants that are several hops (in terms of number of intermediate devices forwarding the tasks) away from the digital-assistant implemented at the first mobile computing device 110-1 that originally assigns the digital-assistant task. In these embodiments, the electronic task report corresponding to the assigned digital-assistant is routed back from the fourth mobile computing device to the first mobile computing device 110-1 (via an intermediate device i.e. second mobile computing device 110-2) that originally assigns the digital-assistant task in accordance with routing protocols, for example, implemented for ad-hoc and mesh networks.

In accordance with some embodiments, if the second mobile computing device 110-2 determines that it is unable to perform the assigned digital-assistant task, the second mobile computing device 110-2 transmits, via the direct-mode wireless air-interface link 120-1, an acknowledgment to the first mobile computing device 110-1, the acknowledgment indicating that the assigned digital-assistant task will be not executed by the second mobile computing device 110-2.

In accordance with some embodiments, the plurality of mobile computing devices 110 form a wireless ad-hoc network (e.g., a mobile ad-hoc network (MANET), a mesh network, etc.,) and further each mobile computing device 100 periodically broadcasts a presence message indicating its presence (e.g., located within a transmission range) to other mobile computing devices 110 that are within the wireless ad-hoc network. Each mobile computing device 110 may maintain a presence list that identifies mobile computing devices 110 that are actively connected to the wireless ad-hoc network. A mobile computing device 110 is said to be actively connected to the wireless ad-hoc network if it has sent a presence message in a preceding given time period (e.g., in the last 5 seconds). Also, each mobile computing device 110 may remove a mobile computing device from the list if the mobile computing device has not sent a presence message in the preceding time period. In accordance with some embodiments, a mobile computing device 110 requests for digital-assistant capability information from other mobile computing devices 110 identified in the presence list and further requests mobile computing devices 110 that are selected based on the received capability information to perform one or more digital-assistant tasks in accordance with the method 400 illustrated in FIG. 4. In accordance with some embodiments, when a first mobile computing device 110-1 does not receive a presence message from a second mobile computing device 110-2 which has been assigned a digital-assistant task, the first mobile computing device 110-1 may identify a third mobile computing device 110-3 from the presence list and may re-assign a previously assigned digital-assistant task to the third mobile computing device 110-3 if the third mobile computing 110-3 is capable of performing the digital-assistant task previously assigned to the second mobile computing device 110-2. Similarly, when the digital-assistant capability information 376 received from a new mobile computing device 110 that enters the wireless ad-hoc network indicates that the new mobile computing device 110 has more capabilities (e.g., new mobile computing device has face recognition function which is not implemented at the third mobile computing device 110-3) than the third mobile computing device 110-2, then the first mobile computing device 110-1 may re-assign the digital-assistant task (previously assigned to the third mobile computing device 110-2) to the new mobile computing device. In this manner, the mobile computing devices 110 may request and/or execute digital-assistant tasks within the ad-hoc wireless network and further without connecting to an infrastructure network or server.

Figure 6:
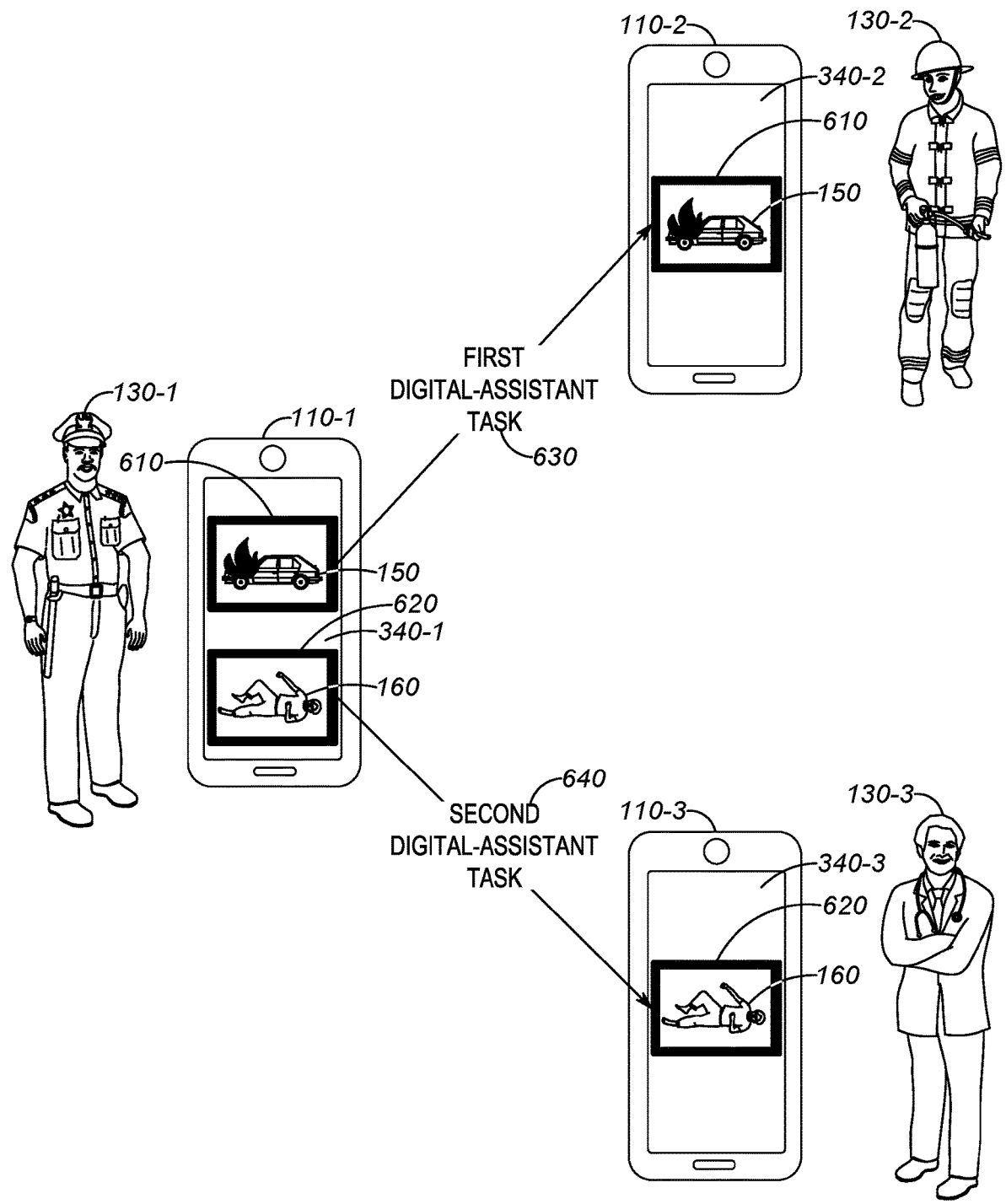
FIGS. 6-9 show an example scenario to illustrate the assignment and execution of digital-assistant tasks by the mobile computing devices.

FIGS. 6-9 show an example scenario to illustrate the assignment and execution of digital-assistant tasks by the mobile computing devices 110. Mobile computing devices 110-1, 110-2, and 110-3 (same or similar to the respective mobile computing devices 110-1, 110-2, 110-3 shown in FIG. 1) are shown, where the first mobile computing device 110-1 obtains the incident data, for example, images of the incident data captured at the incident location 140 shown in FIG. 1. The images of the obtained incident data may be displayed via a display screen 340-1 of the first mobile computing device. As shown in FIG. 6, an image 610 of the vehicle 150 under explosion and an image 620 of the injured person 160 is displayed on the display screen 340 of the first mobile computing device 110-1. In response to obtaining the incident data, the first mobile computing device 110-1 automatically or based on input from the user 130-1 determines a first digital-assistant task 630 corresponding to the image 610 and a second digital-assistant task 640 corresponding to the image 620. The first digital-assistant task 630 and second digital-assistant task 640 may be a combination of video analytics and dispatch task which require a digital-assistant executing the task to identify a resource that may be required to provide aid at the incident location based on video analytics and further assign the resource to be dispatched to the incident location 140 to respond to the incident. In this example, the first mobile computing device 110-1 maps and assigns the first digital-assistant task to the second mobile computing device 110-2 based on the digital-assistant capability information 376 (for example, identifying role of the user 130-2 (i.e., 'fireman') associated with the second mobile computing device 110-2). Similarly, the first mobile computing device 110-1 maps and assigns the second digital-assistant task to the third mobile computing device 110-3 based on the digital-assistant capability information 376 (for example, identifying role of the user 130-3 (i.e., 'medic') associated with the third mobile computing device 110-3).

The first mobile computing device 110-1 transmits the first digital-assistant task 630 to the second mobile computing device 110-2 along with the corresponding image 610 for image processing. Similarly, the first mobile computing device 110-1 transmits the second digital-assistant task 640 to the third mobile computing device 110-3 along with the corresponding image 620 for image processing. As shown in FIG. 6, the second mobile computing device 110-2, upon receiving the first digital-assistant task 630, displays the image 610 of the vehicle 150 under explosion on the display screen 340-2. Similarly, the third mobile computing device 110-3, upon receiving the second digital-assistant task 640, displays the image 620 of the injured person 160 on the display screen 340-3.

Figure 7:
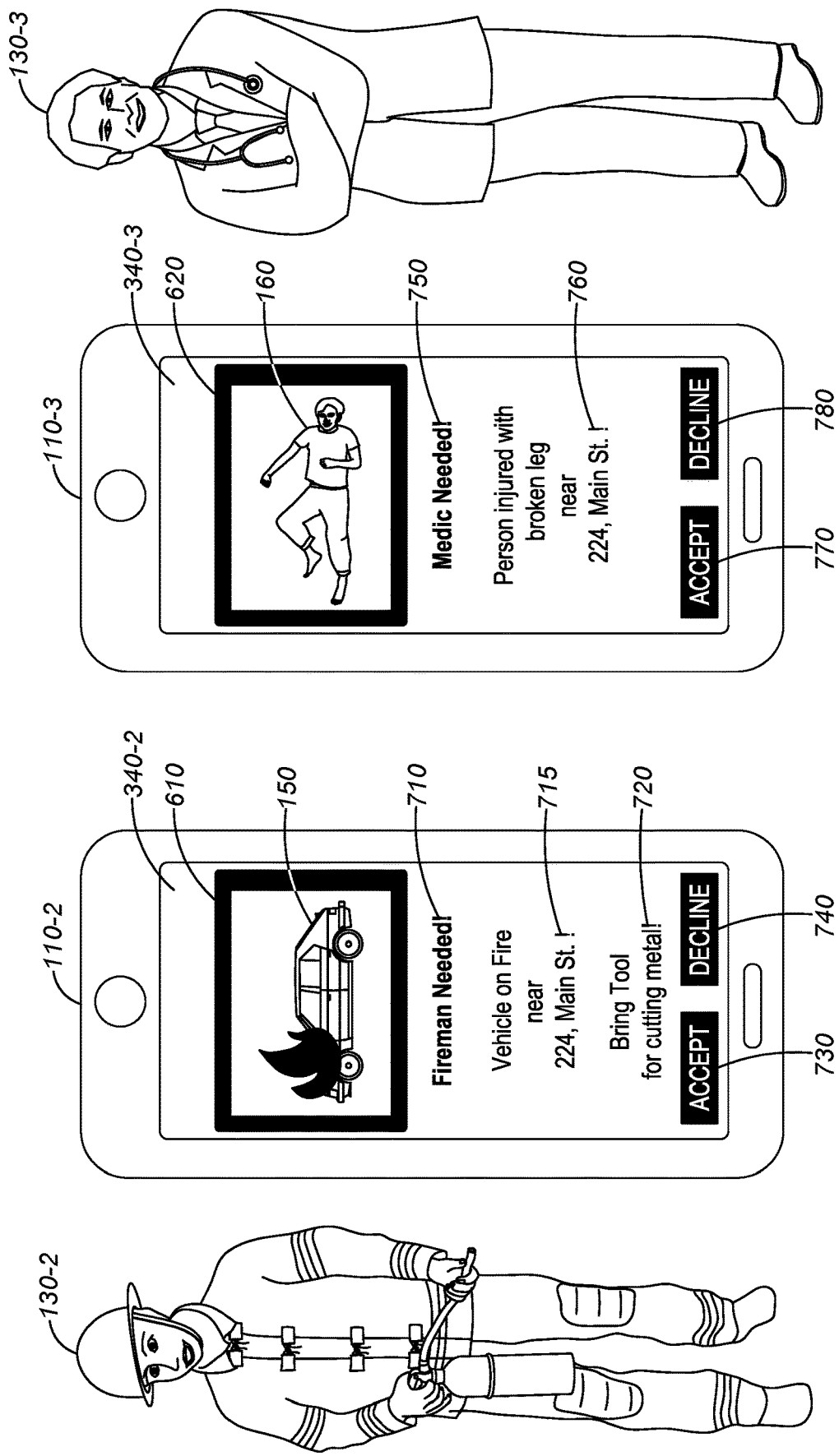

The second mobile computing device 110-2 and third mobile computing device 110-3 process the images 610, 620, respectively. The second and third mobile computing devices 110-2, 110-3 may use object recognition algorithms to automatically identify persons, objects, or entities and/or their associated condition or status. For example, the second mobile computing device 110-2 recognizes 'fire' in the image 610 and further automatically determines that the vehicle 150 is under explosion. Accordingly, the second mobile computing device 110-2 generates an electronic dispatch request which is displayed on the display screen 340-2. For example, as shown in FIG. 7, the electronic dispatch request displayed on the display screen 340-2 of the second mobile computing device 110-2 includes information related to one or more of: type of first responder required to respond to the incident (Fireman Needed!' (710)), status or condition of a person, object, or entity of interest related to the incident along with the address of the incident location 140 (Vehicle on Fire near 224, Main St.!' (715)), special instructions such as tools/equipment to be brought to the incident location (Bring Tool for cutting metal!' (720)). Further, a response mechanism is provided for the user 130-2 to accept or decline the dispatch request. As shown in FIG. 7, the user 130-2 can accept the dispatch request by selecting a first graphical user interface button 'ACCEPT' 730 and decline the dispatch request by selecting a second graphical user interface button 'DECLINE' 740.

Similarly, the third mobile computing device 110-3 recognizes, from the image 620, that the person 160 is injured and generates an electronic dispatch request which is displayed on the display screen 340-3. For example, as shown in FIG. 7, the electronic dispatch request displayed at the third mobile computing device 110-3 includes information related to one or more of: type of first responder required to respond to the incident ('Medic Needed!' (750)), and status or condition of a person, object, or entity of interest related to the incident along with the address of the incident location (Person Injured with broken leg near 224, Main St.!' (760)). Further, a response mechanism is provided for the user 130-3 to accept or decline the dispatch request. As shown in FIG. 7, the user 130-3 can accept the dispatch request to send the medic by selecting a first graphical user interface button 'ACCEPT' 770 and decline the dispatch request by selecting a second graphical user interface button 'DECLINE' 780.

Figure 8:
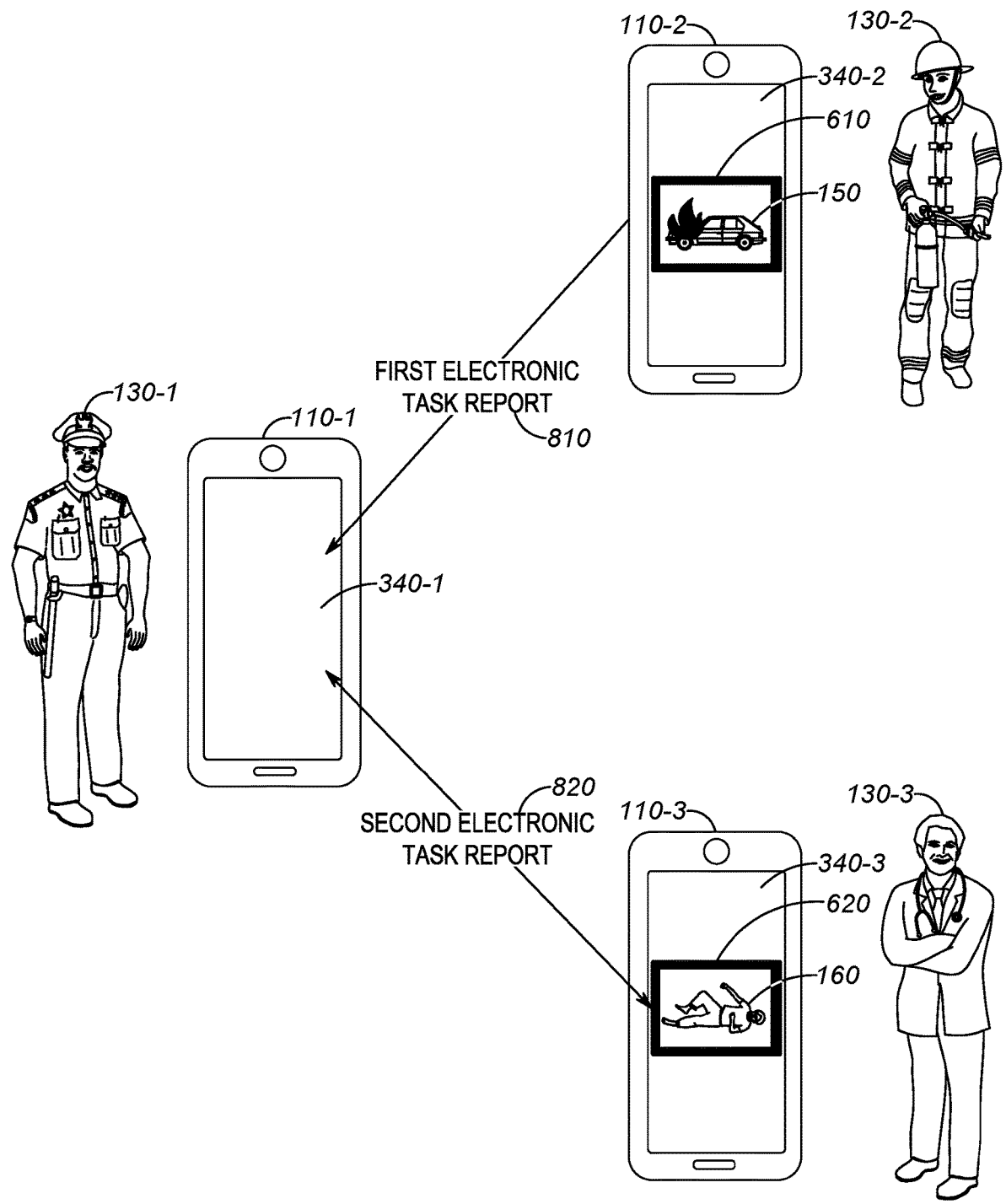

After executing the respectively assigned digital-assistant tasks, for example, when a confirmation is received at the response mechanism indicating that the user has accepted the respective dispatch requests, the second and third mobile computing devices 110-2, 110-3 respectively generates a first electronic task report 810 and a second electronic task report 820 which are further transmitted to the first mobile computing device 110-1 as shown in FIG. 8.

Figure 9:
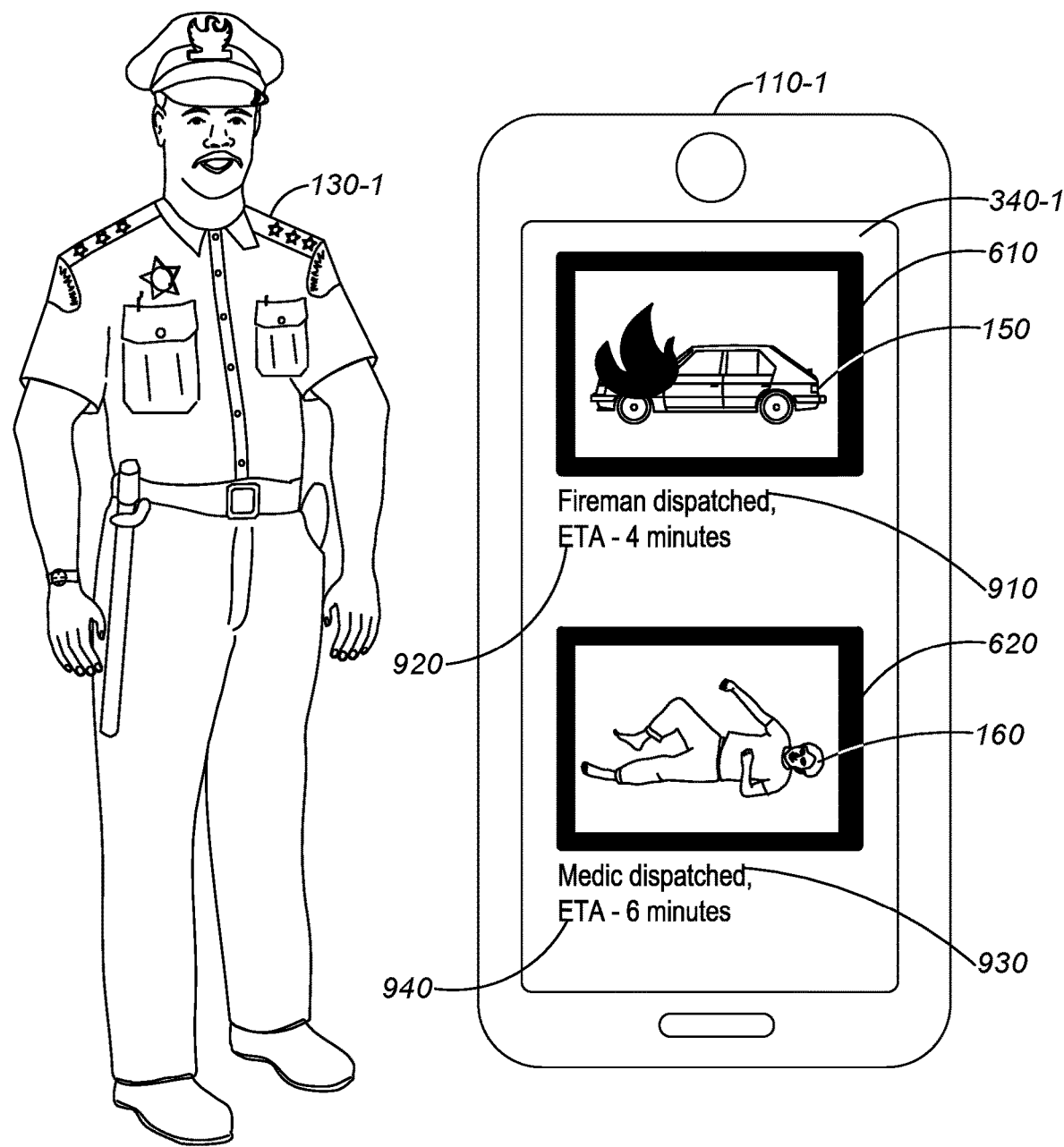

The first mobile computing device 110-1, upon receiving the first and second electronic task reports 810, 820, respectively from the second and third mobile computing devices 110-2, 110-3, displays the task report information on the display screen 340-1. For example, as shown in FIG. 9, the display screen 340-1 displays information indicating that the fireman has been dispatched 910 with an established time of arrival (ETA) of 4 minutes 920. In the example shown in FIG. 9, information 910, 920 may be displayed along with the image 610 that identifies that the vehicle 150 is under explosion. Similarly, the display screen 340-1 displays information indicating the medic has been dispatched 930 with ETA of 6 minutes 940. Information 930, 940 may be displayed along with the image 620 that identifies that the person 160 is injured. Display of information 910, 920, 930, 940 allows the user to visually check the status of the digital-assistant tasks transmitted to other mobile computing devices.

In accordance with embodiments described herein, system, device, and methods disclosed herein can be advantageously employed to request resources for providing better aid at an incident location even if a user requesting resource is unable to communicate with a dispatcher or an emergency call server. The embodiments described herein allow mobile computing devices to automatically request resources by distributing digital-assistant tasks that are determined based on incident data to other mobile computing devices and users located nearby at an incident location. Embodiments described herein also further allow the digital-assistants tasks to be distributed and executed in a non-centralized ad-hoc network.

In the foregoing specification, specific embodiments have been described. However, one of ordinary skill in the art appreciates that various modifications and changes may be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment may be implemented as a computer-readable storage medium having computer readable code stored thereon for programming a computer (for example, comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it may be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A mobile computing device, comprising:
a wireless transceiver;
a video camera; and
an electronic processor communicatively coupled to the wireless transceiver and the video camera, the electronic processor configured to:
   obtain video data associated with an incident from the video camera;
   analyze, via a video analytics engine implemented at the mobile computing device, the video data and detect a first person, object, or entity of interest captured in the video data and a second person, object, or entity of interest captured in the video data;
   determine, based on the obtained video data, a plurality of digital-assistant tasks to be executed by a plurality of other mobile computing devices in response to the incident, the plurality of digital-assistants tasks including a first video analytics task to detect a condition or a status of the first person, object, or entity of interest detected in the video data and a second video analytics task to detect a condition or a status of the second person, object, or entity of interest detected in the video data;
   determine that a connection to a dispatch server is not available, and in response to the determination, establish, via the wireless transceiver, a direct-mode wireless connection with the plurality of other mobile computing devices to obtain the digital-assistant capability information;
   transmit, via the wireless transceiver, a request for digital-assistant capability information to the plurality of other mobile computing devices implementing respective digital assistants;
   receive, via the wireless transceiver, digital-assistant capability information from a first mobile computing device and a second mobile computing device of the plurality of other mobile computing devices, the digital-assistant capability information including device capability, software capability, and network capability of the respective digital assistants implemented at the first and second mobile computing devices;
   determine, without input from the dispatch server, based on the digital-assistant capability information respectively received from the first and second mobile computing devices, that the first and second mobile computing devices are capable of respectively executing the first video analytics task and the second video analytics task, the digital-assistant capability information identifying device capability, software capability, and network capability;
   assign the first video analytics task to the first mobile computing device and the second video analytics task to the second mobile computing device;
   identify a first set of one or more frames of the video data and a second set of one or more frames of the video data, the first set of one or more frames of the video data containing only video data relevant to the first person, object, or entity of interest and the second set of one or more frames of the video data containing only video data relevant to the second person, object, or entity of interest;
   transmit, via the wireless transceiver, a first instruction requesting the first mobile computing device to execute the first video analytics task-to detect a condition or a status of the first person, object, or entity of interest detected in the first set of one or more frames of the video data, the first instruction including the first set of one or more frames of the video data, a priority level of the first video analytics task, and information identifying the type of video analytics task; and
   transmit, via the wireless transceiver, a second instruction requesting the second mobile computing device to execute the second video analytics task to detect a condition or a status of the second person, object, or entity of interest detected in the second set of one or more frames of the video data, the second instruction including the second set of one or more frames of the video data, a priority level of the second video analytics task, and information identifying the type of video analytics task.

2. The mobile computing device of claim 1, wherein the electronic processor is configured to receive, via the wireless transceiver, an acknowledgment from the first and second mobile computing devices, the acknowledgment indicating whether the first and second mobile computing device will execute the first and second video analytics tasks, respectively.

3. The mobile computing device of claim 1, wherein the electronic processor is configured to receive, via the wireless transceiver, a first electronic task report indicating a status or a condition of the first person, object, or entity of interest detected in the first set of one or more frames of the video data.

4. The mobile computing device of claim 1, wherein the electronic processor is configured to receive, via the wireless transceiver, a second electronic task report indicating a status or a condition of the second person, object, or entity of interest detected in the video data.

5. The mobile computing device of claim 1, wherein the electronic processor is configured to:
   detect that the first and second mobile computing devices are both capable of executing the first and second video analytics tasks;
   identify a role of a first user associated with the first mobile computing device and a role of a second user associated with the second mobile computing device;

assign the first video analytics task to the first mobile computing device only when the role of the first user associated with the first mobile computing device is related to responding to a status or condition of the first person, object, or entity of interest detected in the video data; and assign the second video analytics task to the second mobile computing device only when the role of the second user associated with the second mobile computing device is related to responding to a status or condition of the second person, object, or entity of interest detected in the video data.

6. The mobile computing device of claim 1, wherein the electronic processor is configured to:

determine that the first mobile computing device is capable of executing the first video analytics task when the digital-assistant capability information received from the first mobile computing device indicates that a type of video analytics engine implemented at the first mobile computing device is capable of processing the video data and detect, without user input, a condition or a status of the first person, object, or entity of interest detected in the video data.

7. The mobile computing device of claim 1, wherein the electronic processor is configured to:

determine that the second mobile computing device is capable of executing the second video analytics task when the digital-assistant capability information received from the second mobile computing device indicates that a type of video analytics engine implemented at the second mobile computing device is capable of processing the video data and detect, without user input, a condition or a status of the second person, object, or entity of interest detected in the video data.

8. A method of assigning a digital-assistant task in response to an incident, the method comprising:

obtaining, at a mobile computing device, video data associated with an incident, the video data captured by a video camera implemented at the mobile computing device;

analyzing, via a video analytics engine implemented at the mobile computing device, the video data and detecting a first person, object, or entity of interest captured in the video data and a second person, object, or entity of interest captured in the video data;

determining, at the mobile computing device, based on the obtained video data, a plurality of digital-assistant tasks to be executed by a plurality of other mobile computing devices in response to the incident, the plurality of digital-assistants tasks including a first video analytics task to detect a condition or a status of the first person, object, or entity of interest detected in the video data and a second video analytics task to detect a condition or a status of the second person, object, or entity of interest detected in the video data;

determining, at the mobile computing device, that a connection to a dispatch server is not available;

in response to the determination, establishing a direct-mode wireless connection with each of the plurality of other mobile computing devices to obtain the digital-assistant capability information;

wirelessly transmitting, at the mobile computing device, a request for digital-assistant capability information to the plurality of other mobile computing devices implementing respective digital assistants;

wirelessly receiving, at the mobile computing device, digital-assistant capability information from a first mobile computing device and a second mobile computing device of the plurality of other mobile computing devices, the digital-assistant capability information including device capability, software capability, and network capability of the respective digital assistants implemented at the first and second mobile computing devices;

determining, at the mobile computing device, without input from the dispatch server, based on the digital assistant capability information respectively received from the first and second mobile computing devices, that the first and second mobile computing devices are capable of respectively executing the first video analytics task and the second analytics task, the digital-assistant capability information identifying device capability, software capability, and network capability;

assigning, at the mobile computing device, the first video analytics task to the first mobile computing device and the second video analytics task to the second mobile computing device;

identifying a first set of one or more frames of the video data and a second set of one or more frames of the video data, the first set of one or more frames of the video data containing only video data relevant to the first person, object, or entity of interest and the second set of one or more frames of the video data containing only video data relevant to the second person, object, or entity of interest;

transmitting, at the mobile computing device, a first instruction requesting the first mobile computing device to execute the first video analytics task to detect a condition or a status of the first person, object, or entity of interest detected in the first set of one or more frames of the video data, the first instruction including the first set of one or more frames of the video data, a priority level of the first video analytics task, and information identifying the type of video analytics task; and transmitting, at the mobile computing device, a second instruction requesting the second mobile computing device to execute the second video analytics task to detect a condition or a status of the second person, object, or entity of interest detected in the second set of one or more frames of the video data, the second instruction including the second set of one or more frames the video data, a priority level of the second video analytics task, and information identifying the type of video analytics task.

9. The method of claim 8, further comprising:

wirelessly receive, at the mobile computing device, an acknowledgment from the first and second mobile computing devices, the acknowledgment indicating whether the first and second mobile computing device will execute the first and second video analytics tasks, respectively.

10. The method of claim 8, further comprising:

wirelessly receiving, at the mobile computing device, a first electronic task report from the first mobile computing device indicating a status or a condition of the first person, object, or entity of interest detected in the video data.

11. The method of claim 8, further comprising:

wirelessly receiving, at the mobile computing device, a second electronic task report from the second mobile computing device indicating a status or a condition of the second person, object, or entity of interest detected in the video data.

12. The method of claim 8, further comprising:
detecting, at the mobile computing device, that the first and second mobile computing devices are both capable of executing the first and second video analytics tasks;
identifying, at the mobile computing device, a role of a first user associated with the first mobile computing device and a role of a second user associated with the second mobile computing device;
assigning, at the mobile computing device, the first video analytics task to the first mobile computing device only when the role of the first user associated with the first mobile computing device is related to responding to a status or condition of the first person, object, or entity of interest detected in the video data; and
assigning, at the mobile computing device, the second video analytics task to the second mobile computing device only when the role of the second user associated with the second mobile computing device is related to responding to a status or condition of the second person, object, or entity of interest detected in the video data.

13. The method of claim 8, further comprising:
determining, at the mobile computing device, that the first mobile computing device is capable of executing the first video analytics task when the digital-assistant capability information received from the first mobile computing device indicates that a type of video analytics engine implemented at the first mobile computing device is capable of processing the video data and further detecting, without user input, a condition or a status of the first person, object, or entity of interest detected in the video data.

14. The method of claim 8, further comprising:
determining, at the mobile computing device, that the second mobile computing device is capable of executing the second video analytics task when the digital-assistant capability information received from the second mobile computing device indicates that a type of video analytics engine implemented at the second mobile computing device is capable of processing the video data and further detecting, without user input, a condition or a status of the second person, object, or entity of interest detected in the video data.

* * * * *